(12) United States Patent
Allon et al.

(10) Patent No.: US 7,965,905 B2
(45) Date of Patent: Jun. 21, 2011

(54) DEVICE, METHOD AND SYSTEM FOR AUTOMATIC STABILIZATION OF A SERIES OF RETINAL IMAGES

(75) Inventors: Noam Allon, Haifa (IL); Nizan Horesh, Moshav Nahalal (IL)

(73) Assignee: Ophthalmic Imaging Systems Inc., Sacramento, CA (US)

( * ) Notice: Subject to any disclaimer, the term of this patent is extended or adjusted under 35 U.S.C. 154(b) by 974 days.

(21) Appl. No.: 11/648,603

(22) Filed: Jan. 3, 2007

(65) Prior Publication Data

US 2007/0292037 A1 Dec. 20, 2007

Related U.S. Application Data

(63) Continuation-in-part of application No. 11/455,657, filed on Jun. 20, 2006.

(51) Int. Cl.
*G06K 9/32* (2006.01)
*G06K 9/36* (2006.01)
*G06K 9/40* (2006.01)
*G06K 9/62* (2006.01)
*G06K 9/52* (2006.01)
*G06K 9/46* (2006.01)
*G06K 9/66* (2006.01)
*G06K 9/00* (2006.01)

(52) U.S. Cl. ........ 382/294; 382/295; 382/285; 382/275; 382/209; 382/206; 382/128; 382/195

(58) Field of Classification Search .................. None
See application file for complete search history.

(56) References Cited

U.S. PATENT DOCUMENTS

| 5,568,208 | A | 10/1996 | Van de Velde | |
|---|---|---|---|---|
| 6,293,674 | B1 | 9/2001 | Huang | |
| 6,341,865 | B1 | 1/2002 | Muehlhoff | |
| 6,393,163 | B1 * | 5/2002 | Burt et al. | 382/294 |
| 6,454,410 | B1 * | 9/2002 | Berger et al. | 351/206 |

OTHER PUBLICATIONS

Shum et al. (Construction and refinement of panoramic mosaics with global and local alignment, Proceedings of the Sixth Int'l Conf. on Computer Vision, 1998, pp. 953-958).*

Hsu et al., Steve, "Automated Masaics via Topology Interference", IEEE Computer Graphics and Applications, vol. 22, Issue 2, pp. 44-54, Mar. 2002.*

Can et al., Ali, "A Feature-Based Technique for Joint, Linear Estimation of High-Order Image-to-Mosaic Transformations: Mosaicing the Curved Human Retina", IEEE Transactions on Pattern Analysis and Machine Intelligence, vol. 24, No. 3, pp. 412-419, Mar. 2002.*

* cited by examiner

*Primary Examiner* — Tom Y Lu
*Assistant Examiner* — Thomas A Conway
(74) *Attorney, Agent, or Firm* — Browdy and Neimark, P.L.L.C.

(57) ABSTRACT

Some embodiments of the present invention may relate to a device and a method of enabling the stabilization of a series of retinal angiography images to provide a coherent serial display, the method comprising: locally matching a pair of overlapping images, said locally matching includes at least providing a best offset vector for the images, wherein the best offset vector is provided based upon a matching of features from overlapping portions of the images; globally matching at least a triplet of matching pairs of images, wherein pairs of globally matching images include locally matching pairs whose best offset vector sum is substantially zero; choosing a key image; and aligning all the remaining images to the key image.

15 Claims, 17 Drawing Sheets

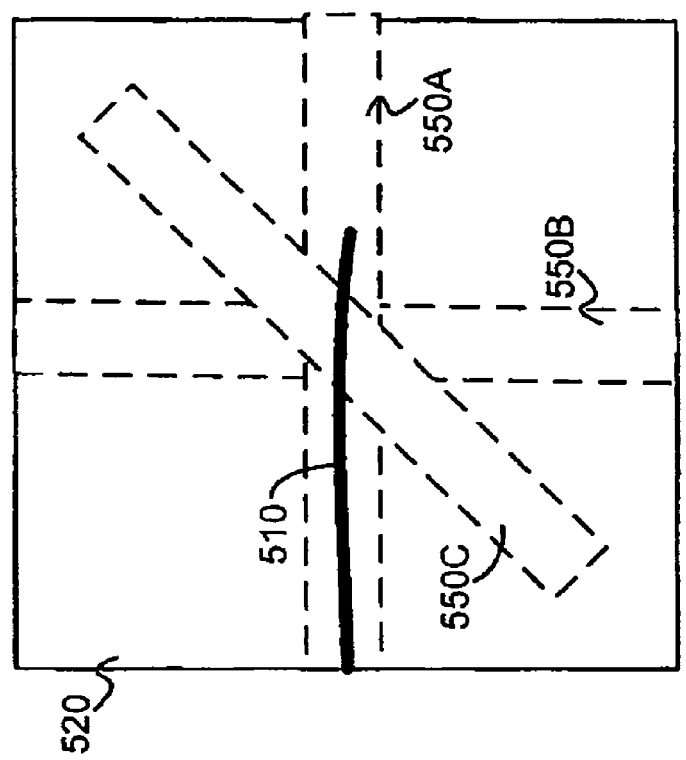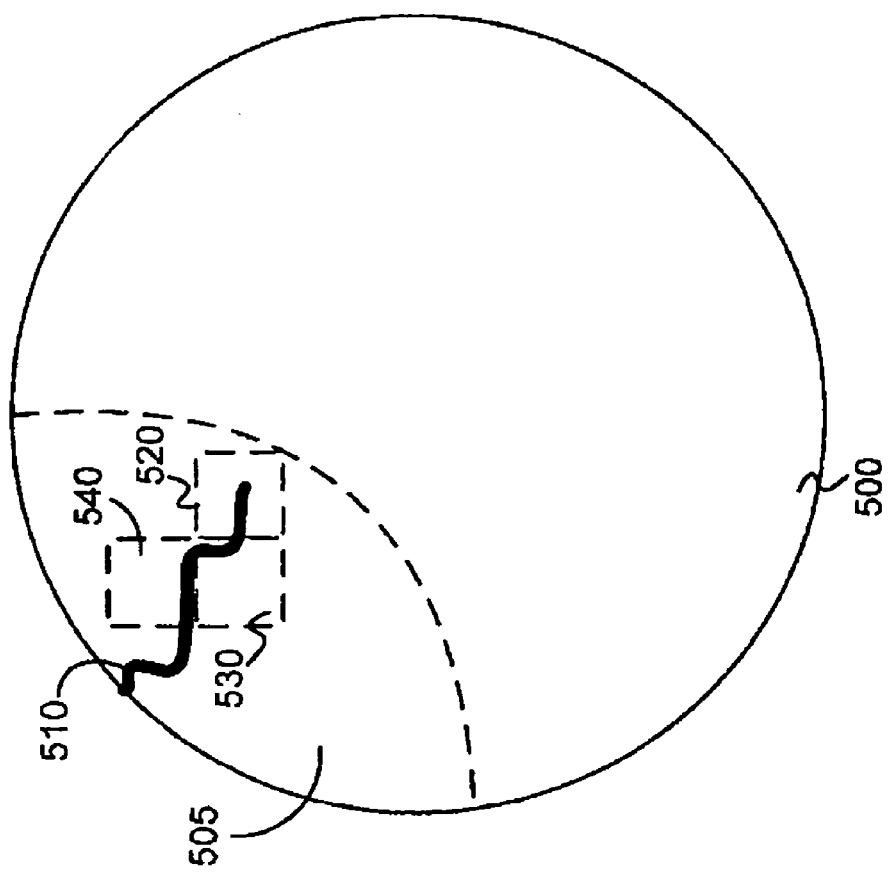
FIG. 5

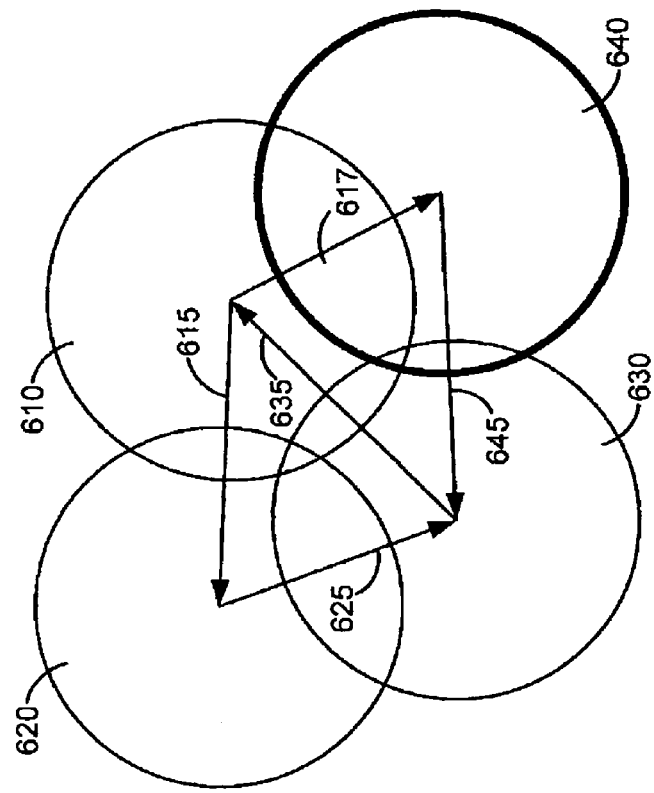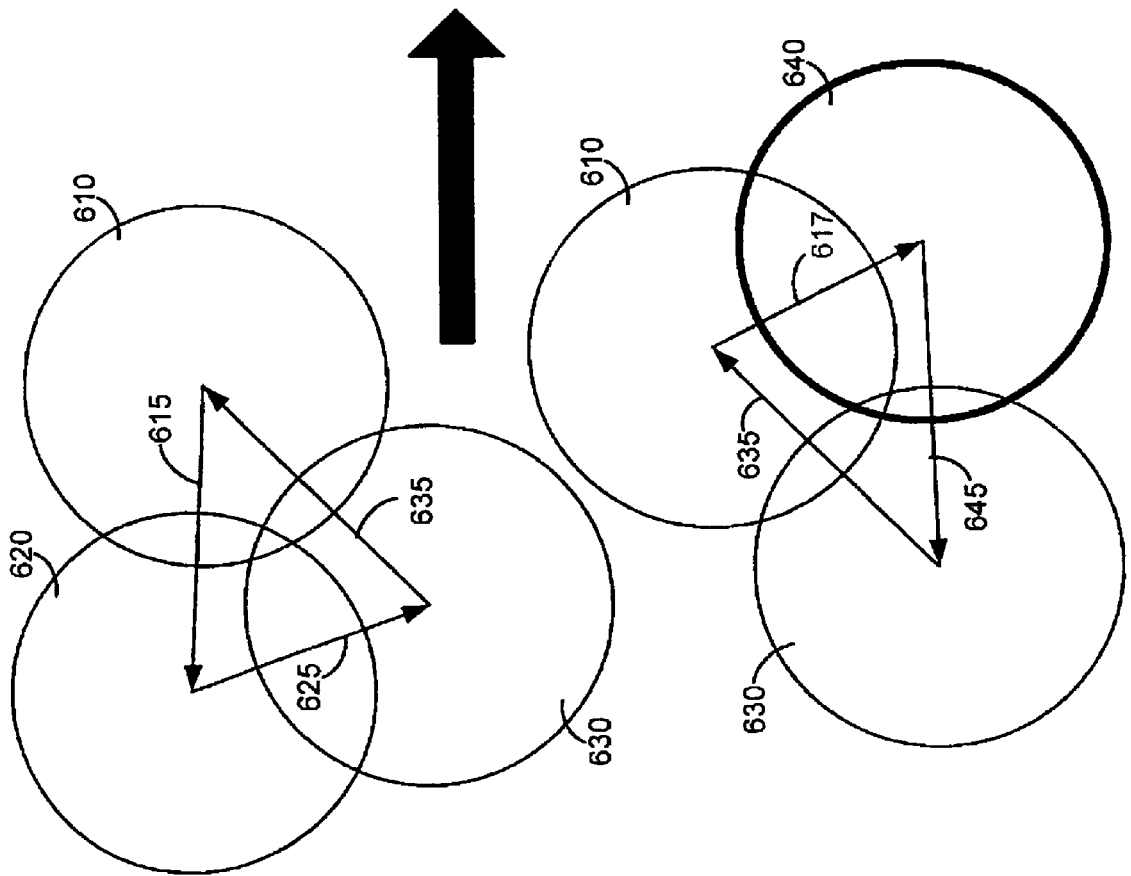
FIG. 6

DEVICE, METHOD AND SYSTEM FOR AUTOMATIC STABILIZATION OF A SERIES OF RETINAL IMAGES

CROSS-REFERENCE TO RELATED APPLICATIONS

The present application is a Continuation in Part of U.S. patent application Ser. No. 11/455,657, filed Jun. 20, 2006, entitled "A DEVICE, METHOD AND SYSTEM FOR AUTOMATIC MONTAGE OF SEGMENTED RETINAL IMAGES".

FIELD OF THE INVENTION

The present invention generally relates to the field of fundus imaging.

BACKGROUND OF THE INVENTION

In modern ophthalmology there is a growing demand for accurate images of the eye and of the retina, in particular, to allow practitioners to inspect and diagnose various medical conditions involving the fundus (retina) and to facilitate advanced treatments. Effective fundus imaging should clearly show the features of the fundus and any artifacts on its surface, and should be at least consistent with the actual fundus.

Fluorescein angiography is an extremely valuable test that provides information about the circulation system and the condition of the back of the eye. Fluorescein angiography tests are useful in evaluating many eye diseases that affect the retina and the choroid (sub-retina). The test is performed by injecting a special orange-colored dye, called fluorescein, into a vein in the patient's arm, from which the dye circulates through the blood vessels of the body. As the dye enters the blood vessels of the eye, a series of photographs of the retina are taken with a camera equipped with special filters. These filters highlight the fluorescein dye and make it stand out against the background of the retina. The series of photographs is then replayed in a sequence in a movie loop, so that the ophthalmologist may follow the fluorescein dye advance through the blood vessels. Any circulation problems, swelling, leaking or abnormal blood vessels on the retina or the choroids will be revealed by the dye and its patterns.

A significant clinical challenge relates to the normal patient movement during the series of images that may be taken over a period of time from 1 minute to 15 minutes or longer. A solution that allows the same relative location of specific pathologies within the imaged area is valuable from a clinical perspective, as it allows the stabilization of these pathologies on the screen and a simpler assessment of the growth, or the change in location of hyper-fluorescent, or hypo-fluorescent areas of the retina/choroid. The ophthalmologist can then take a determination as to the diagnosis and possible treatment options; now with higher efficacy with the pathology now stabilized as to its relative location in the series.

As is well known, the fundus is a substantially spherical surface. For purposes of capturing a spherical surface on an image, a wide angle lens may appear to be a good choice. Unfortunately, wide angled lenses are characterized in that the wider the angle of view of the lens the lower the resolution of the images produced using the lens will become. Furthermore, the translation of the image captured by the wide angle lens to a planar image creates some distortions at the edges of the image. The distortions commonly increase with the angle of view of the lens. These distortions are commonly referred to as "wide-angle distortion". Additionally, it is quite problematic to provide adequate illumination of a wide angle of the fundus.

Thus, the lenses used for photographing the fundus are typically not wide angle lenses and have a substantially smaller field of view. Commonly used retinal (fundus) cameras typically provide an effective view of about 30-60 degrees of the retina per photograph (or image) taken. As a result, in order to provide a representation of larger portions of the retina, several images are taken from different angles. In order to ease the diagnosis and storage of the retinal representation, the images need to be stitched to one another to provide a single synthetic montage image or mosaic which covers the required field of view.

In order to achieve a consistent planar representation of the fundus (or of any significant portion of the fundus) the images need to be correctly matched and positioned in relation to one another. In the past, matching of the images was done manually. Matching of images manually requires considerable skill and time and is sometimes not accurate. Although attempts have been made to provide a method of automatically matching of images, these methods provide a local matching of pairs of images only, and even if one succeeds in locally matching pairs of images, simply having matching pairs is not enough to provide a consistent planar representation of the fundus.

There is thus a need to provide a system and a method of enabling automatic production of a consistent planar representation of the fundus from a plurality of images, as part of which, one or more groups of matching images comprised of more than two images are locally and globally matched.

Furthermore, the current techniques used for creating a planar representation of the fundus are inherently limited. In order to represent any significant portion of a spherical surface on a plane, some areas of the spherical surface must be modified (squeezed and stretched). Thus, even if one succeeds in creating a consistent planar representation of the fundus, the planar representation of the originally spherical surface cannot be accurate.

There is thus a further need to provide a system and a method of creating a consistent and substantially accurate representation of the fundus. There is yet a further need to provide system and method of creating a consistent and substantially accurate spherical montage representing the fundus.

SUMMARY OF THE INVENTION

Some embodiments of the present invention may relate to a device for enabling an automatic global matching of a plurality of images to provide a substantially consistent planar representation of a fundus. According to some embodiments of the invention, a device for enabling an automatic global matching of a plurality of images to provide a substantially consistent planar representation of a fundus may include a local matching module and a global matching module. The local matching module may be adapted to locally match a pair of overlapping images. As part of locally matching the images, the local matching module may be adapted to provide a best offset vector for the images based upon a matching of features from overlapping portions of the images. The global matching module may be adapted to globally match at least a triplet of locally matching pairs of images whose best offset vector sum is substantially zero.

Further embodiments of the invention relate to a method of enabling an automatic global matching of a plurality of images to provide a substantially consistent planar representation of a fundus. According to some embodiments of the invention, the method of enabling an automatic global matching of a plurality of images to provide a substantially consistent planar representation of a fundus may include locally matching a pair of overlapping images and globally matching at least a triplet of locally matching pairs of images. Locally matching a pair of images may include at least providing a best offset vector for the images. The best offset vector may be provided based upon a matching of features from overlapping portions of the images. Globally matching at least a triplet of locally matching pairs of images may include globally matching at least a triplet of matching pairs of images whose best offset vector sum is substantially zero in accordance with the pairs' best offset vectors.

According to further embodiments of the invention, the method of enabling an automatic global matching of a plurality of images to provide a substantially consistent planar representation of a fundus may further include calculating a correlation between two images at different offsets, and based upon the correlation between the images determining whether the images are partially overlapping.

According to still further embodiments of the invention, the method of enabling an automatic global matching of a plurality of images to provide a substantially consistent planar representation of a fundus may further include identifying features within the overlapping portions of the images resulting from each of the candidate offset vectors, and calculating a quality value for each of the candidate offset vectors based upon one or more predefined characteristics of the identified features. According to some embodiments of the invention, wherein the method of enabling an automatic global matching of a plurality of images to provide a substantially consistent planar representation of a fundus may further include comparing the quality value associated with each of the one or more candidate offset vectors against a quality threshold and discarding a candidate offset vector whose quality value is not in compliance with the threshold.

Further aspects of the invention relate to a device for providing a consistent montage substantially accurately representing a fundus. According to some embodiments of the invention, the device may include a projection module and an optimization module. According to some embodiments of the invention, the projection module may be adapted to project a plurality of globally matched images collectively corresponding to at least a portion of the fundus onto a substantially spherical model of the fundus to receive an initial spherical representation. The optimization module may be adapted to optimize the initial spherical representation in accordance with a predefined optimization strategy.

Still further aspects of the invention relate to a method of providing a consistent montage substantially accurately representing a fundus. According to some embodiments of the invention, the method of providing a consistent montage substantially accurately representing a fundus may include projecting a plurality of globally matched images collectively corresponding to at least a portion of the fundus onto a substantially spherical model of the fundus to receive an initial spherical representation, and optimizing the initial spherical representation in accordance with a predefined optimization strategy.

According to further embodiments of the invention, the optimization strategy may be based upon one or more of the following: a geometrical model of the fundus; assumed optical characteristics of an imaging system used to generate the images; and assumed relative position of the imaging system and the fundus. According to still further embodiments of the invention, the predefined optimization strategy may provide at least a set of spherical mapping values and an optical factor.

According to still further embodiments of the invention, the projection model may correspond to an optical perspective and to optical media associated with the image rendering system used to provide the plurality of images and/or with the eye.

Further aspects of the present invention relate to a method of stabilizing a series of retinal angiography images to provide a coherent serial display, the method comprising: locally matching each pair of overlapping images, said locally matching includes at least providing a best offset vector for the images, wherein the best offset vector is provided based upon a matching of features from overlapping portions of the images, globally matching at least a triplet of matching pairs of images, wherein pairs of globally matching images include locally matching pairs whose best offset vector sum is substantially zero, choosing a key image, and aligning all the remaining images to the key image.

According to some embodiments, the images comprise an internal fixation device, which is removed from the series of images prior to the step of locally matching.

According to some embodiments, the internal fixation device is restored to the series of images following the step of aligning.

According to some embodiments, choosing a key image comprises choosing the image having the highest amount of correlative data with all the other images.

According to some embodiments, the aligning step comprises computing the distortion between the key image and each of the other images.

According to some embodiments, computing the distortion comprises matching features in the key image to features in the other images using correlation.

According to some embodiments, corrective geometric transformations are calculated to compensate for the distortions.

According to some embodiments, computing corrective geometric transformations comprises using one of a free quadratic model, an affine model and a translation model.

Still further aspects of the invention relate to an apparatus for stabilizing a series of retinal angiography images to provide a coherent serial display, comprising: means for locally matching each pair of overlapping images, said means for locally matching including at least means for providing a best offset vector for the images, wherein the best offset vector is provided based upon a matching of features from overlapping portions of the images, means for globally matching at least a triplet of matching pairs of images, wherein pairs of globally matching images include locally matching pairs whose best offset vector sum is substantially zero, means for choosing a key image, and means for aligning all the remaining images to the key image.

According to some embodiments, the images comprise an internal fixation device and the apparatus further comprises means for removing the internal fixation device from the series of images.

According to some embodiments, the apparatus further comprises means for restoring the internal fixation device to said series of images.

According to some embodiments, the means for choosing a key image comprise means for choosing the image having the highest amount of correlative data with all the other images.

According to some embodiments, the means for aligning comprises means for computing the distortion between the key image and each of the other images.

According to some embodiments, the means for computing comprise means for matching features in the key image and in the other images using correlation.

According to some embodiments, the apparatus further comprises means for computing corrective geometric transformations to compensate for the distortions.

Still further aspects of the invention relate to a program storage device readable by machine, tangibly embodying a program of instructions executable by the machine to perform method steps of enabling the stabilization of a series of retinal angiography images to provide a coherent serial display, said method comprising: locally matching a pair of overlapping images, said locally matching includes at least providing a best offset vector for the images, wherein the best offset vector is provided based upon a matching of features from overlapping portions of the images, globally matching at least a triplet of matching pairs of images, wherein pairs of globally matching images include locally matching pairs whose best offset vector sum is substantially zero, choosing a key image, and aligning all the remaining images to the key image.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 5 is an illustration of some aspects of an analysis of a gradient modulo of at least a portion of an image, according to some embodiments of the invention;

FIG. 6 is an illustration of three images constituting a triplet of matching pairs of images whose best offset vectors' sum is substantially zero and of an additional image which is being globally matched to the globally matched images, according to some embodiments of the invention;

Figure 1:
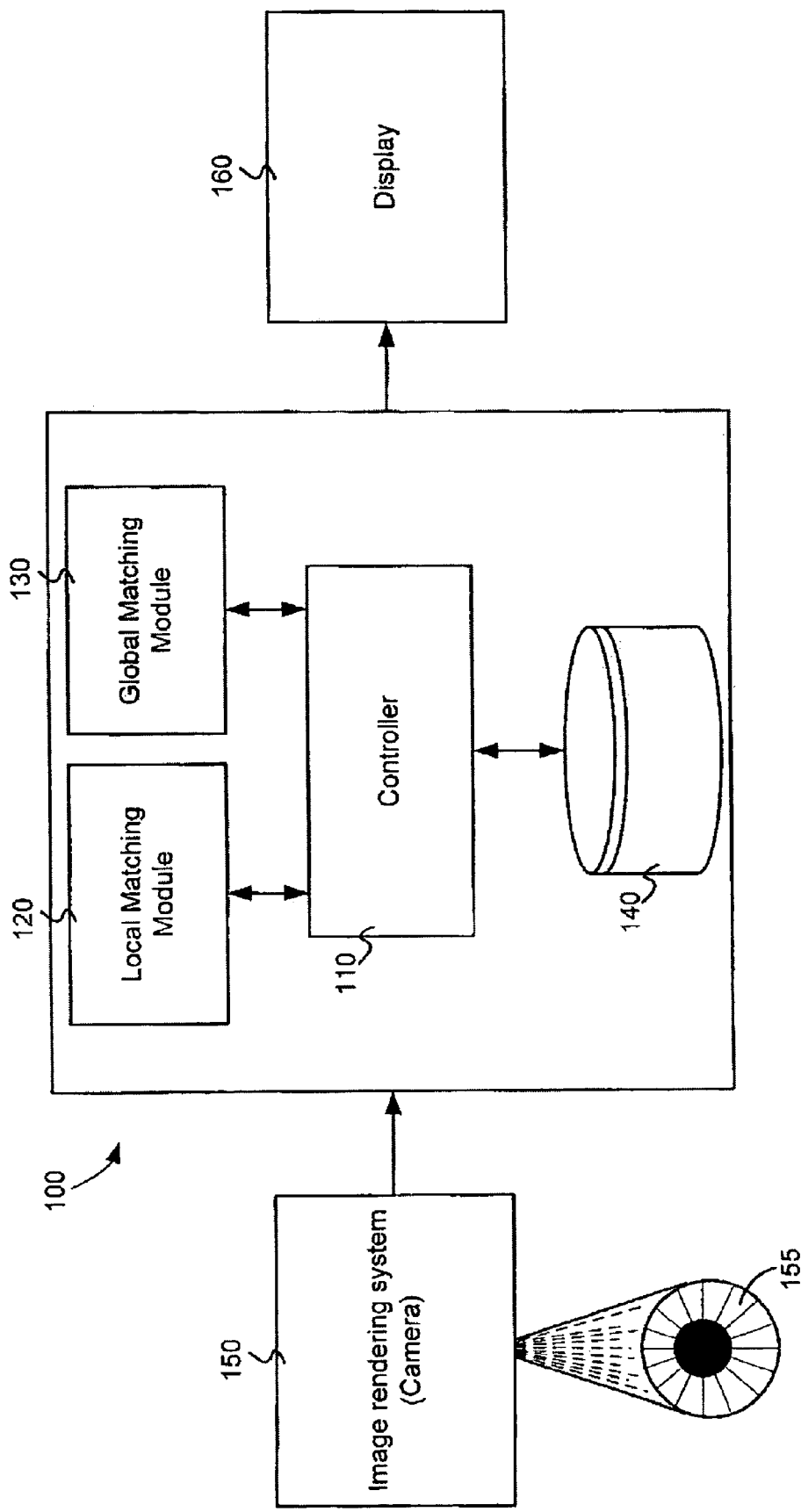
FIG. 1 is a block diagram illustration of a device for enabling an automatic global matching of a plurality of images to provide a consistent planar representation of the fundus, according to some embodiments of the present invention, and of associated systems and devices.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term "matching images" or the like is used. The term "matching images" as used herein, relates to images whose position is interrelated. The term "locally matching images" and the term "matching pair of images" or the like, relates to any pair which have been determined to be at least partially overlapping and whose position on a plane in relation to one another can be determined in accordance with some embodiments of the invention. The term "globally matching images" or the like, relates to three or more matching pairs of images whose relative position on a plane is interrelated and consistent. The relative positions of the globally matching images can be determined in accordance with some embodiments of the invention. It would be appreciated that some embodiments of the present invention may seek to enable an automatic planar representation of the fundus which is comprised of a plurality of images (three or more) which are both locally and globally substantially matched.

Throughout the specification and the claims the term "consistent planar representation" or the like is used. The term "consistent planar representation" as used herein, relates to a planar representation created by globally matching three or more pairs of at least partially overlapping images, such that the global position of each image from the matching pairs of images is substantially consistent with the local matching of each pair. Graph theory further assists in understanding the term "consistent planar representation" and the relationship between the images included in the consistent planar representation. In accordance with graph theory, the positions on a plane of the globally matching images, wherein each image corresponds to a graph vertex, and each matching pair of images (images which share an overlapping matching area) correspond to a graph edge, a consistent planar montage would be represented by a planar graph showing no intersections. It would be appreciated that a consistent planar representation does not necessarily mean that each image in the montage correctly overlaps with all adjacent images.

According to some embodiments of the present invention, there is provided a method and a device for enabling an automatic global matching of a plurality of images to provide a substantially consistent planar representation of a fundus. The method according to some embodiments of the invention may include providing a best offset vector for a matching pair of images, wherein the best offset vector is provided at least based upon a matching of features from the images within an area of overlap area resulting from displacing the images from one another in accordance with one or more candidate offset vectors, and globally matching at least a triplet of matching pairs images, wherein pairs of globally matching images include locally matching pairs whose best offset vector sum is substantially zero. According to some embodiments of the invention, the globally matched images provide a geometrically consistent representation of the fundus.

The device according to some embodiments of the invention may include a local matching module and a global matching module. The local matching module may be adapted to at least provide a best offset vector for a matching pair of images, wherein the best offset vector is provided at least based upon a matching of features from the images within an area of overlap area resulting from displacing the images from one another in accordance with one or more candidate offset vectors. The global matching module may be adapted to globally match at least a triplet of matching pairs images, wherein pairs of globally matching images include locally matching pairs whose best offset vector sum is substantially zero. According to some embodiments of the invention, the local matching module and the global matching module may be operatively connected, and the global matching module may be configured to receive data with respect to locally matching images from the local matching module. Various aspects of the present invention shall be described in greater detail herein below.

Reference is now made to FIG. 1, which is a block diagram illustration of a device for enabling an automatic global matching of a plurality of images to provide a consistent planar representation of the fundus, according to some embodiments of the present invention, and of associated systems and devices. A device for enabling an automatic global matching of a plurality of images 100 may be operatively connected to an image rendering system, such as a camera 150, for example. The camera 150 may be used to provide a plurality of images of the fundus 155. The images may represent different areas of the fundus and at least three of the images may partially overlap. It is well known in the art how to provide a series of images, at least some of which being partially overlapping, for representing a relatively large area of the fundus, e.g., an area which is greater than the area captured by a single image. It should be noted that the source of the plurality of images is not limited to any one particular device or system, and rather the plurality of images may arrive into the device 100 from any suitable source.

The device 100 may receive the plurality of images and may position the images on a plane in relation to one another in a manner to provide a consistent planar representation of the fundus 155, as will be described in greater detail below. According to some embodiments of the present invention, the device 100 may include a local matching module 120 and a global matching module 130. The local matching module 120 may be configured to locally match pairs of images. The global matching module 130 may be adapted to globally match locally matching pairs of images. The global matching module 130 may be adapted to create one or more clusters of globally matching images corresponding to the plurality of images of the fundus 155 or to some of the plurality of images. The global matching module 130 may be adapted to provide a substantially consistent representation of at least a portion of the fundus, to which the plurality of images collectively correspond or to which some of the plurality of images collectively correspond.

The device 100 may further include a controller 110 and a storage medium 140, such as a disk, for example. The controller 110 may be adapted to control various aspects of the operation of the device 100 and any of its components. The storage medium 140 may be used to store data, including but not limited to, prestored data for use during the planar local and/or global matching of the images; and data generated during or as a result of the planar local and/or global matching of the images.

Figure 2:
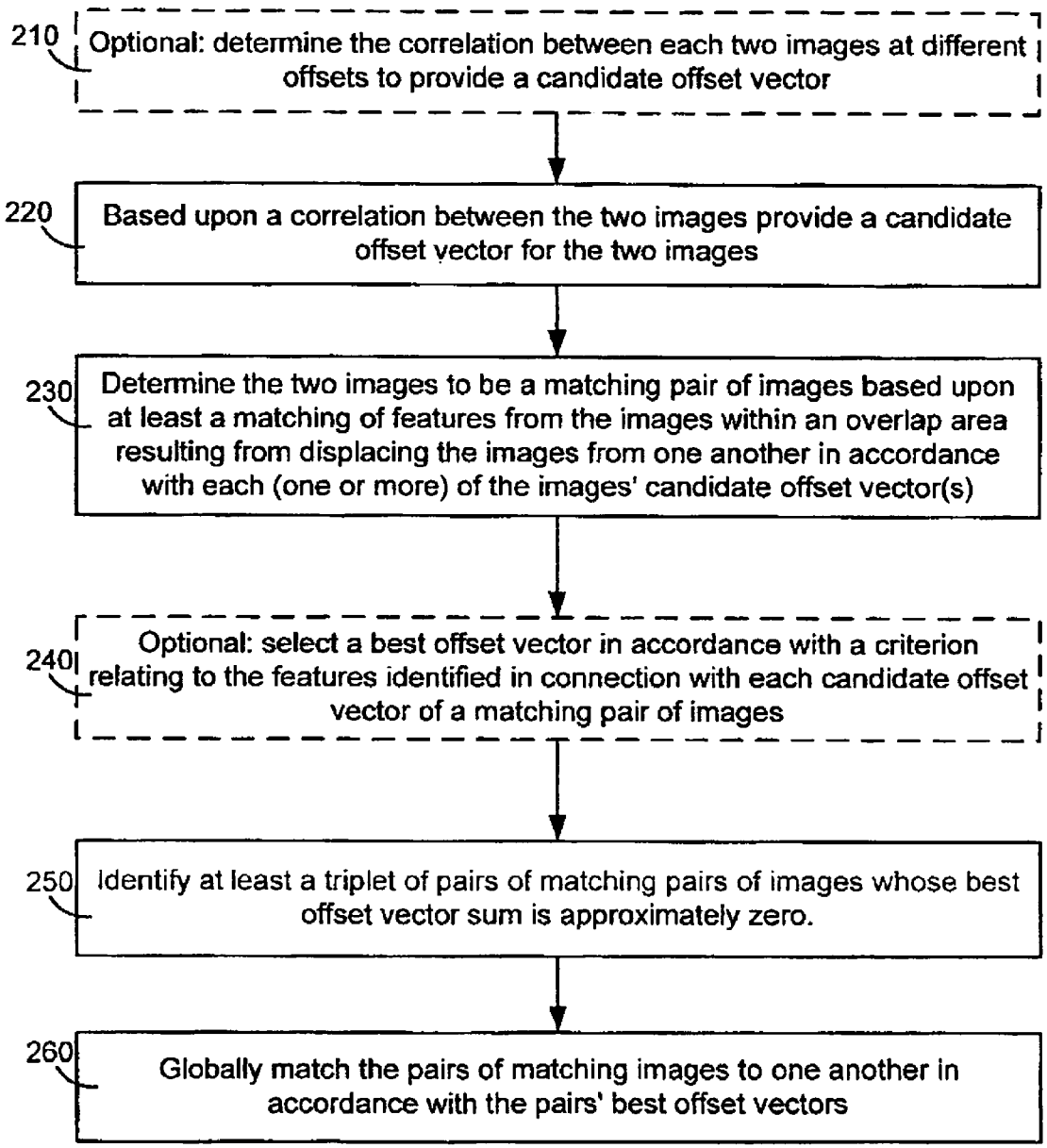
FIG. 2 is a flowchart illustration of a method of enabling an automatic global matching of a plurality of images to provide a substantially consistent planar representation of the fundus.

Reference is now additionally made to FIG. 2, which is a flowchart illustration of a method of enabling an automatic global matching of a plurality of images to provide a substantially consistent planar representation of the fundus. Once received at the device 100, the plurality of images may be directed, for example by the controller 110, to the local matching module 120. If necessary, the controller 110 may also forward the incoming images to the storage medium 140. According to some embodiments of the invention, optionally, upon receiving the images, the local matching module 120 may be adapted to determine the correlation between each two images at different offsets (block 210). The correlation may be performed in accordance with a predetermined correlation policy. According to some embodiments of the invention, the correlation between one or more pairs of images may be performed outside the device 100, for example, manually, and an operator of the device 100 may input the necessary data in respect of a correlation between two images into the device 100. Further details with respect to the data in respect of the correlation between two images shall be provided below. According to some embodiments of the invention, based upon the correlation between two images, the local matching module 120 may be adapted to provide a candidate offset (one or more) for the two images (block 220). As will be described in further detail below, a candidate offset vector may suggest a possible locally matching pair of images whose displacement in relation to one another corresponds to the candidate offset vector, however, according to some embodiments a candidate offset vector is not conclusive evidence of a locally matching pair of images and a possible match is further tested. Furthermore, according to some embodiments of the invention, the correlation between two images may provide a plurality (two or more) of candidate offset vectors, and only one of the candidate offset vector, and in some cases none of the candidate offset vectors provide a locally matching pair of images.

The local matching module 120 may be adapted to determine for each two images having at least one candidate offset vector whether this is a matching pair of images. Two images may be determined by the local matching module 120 to be a matching pair, based upon at least a matching of features from overlapping portions of the images resulting from offsetting the images from one another in accordance with each (one or more) of the images' candidate offset vector(s) (block 230). According to some embodiments of the invention, based upon the matching of features, one or more of the candidate offset vectors may be eliminated in accordance with at least a predefined criterion. The eliminated candidate offset vectors may be the ones, which based upon the matching of features, are considered not to provide a locally matching pair of images. Thus, it would be appreciated, that according to some embodiments of the invention, correlation between two images is not conclusive evidence of a locally matching pair of images.

In case for certain two images there is only one candidate offset vector that provides a locally matching pair of images, that candidate offset vector is determined to be a best offset vector for the pair of images. However, if for certain two images, there is more than one candidate offset vector which provides a locally matching pair of images, the local matching module 120 may be adapted to select a best offset vector in accordance with a criterion relating to the features identified in connection with each candidate offset vector of a matching pair of images (blocks 240). According to some embodiments of the present invention, the at least predefined criterion may be based upon the reliability of the matching of features within an overlap area resulting from displacing the images from one another in accordance with one or more candidate offset vectors. According to further embodiments of the invention, the at least predefined criterion may be based upon the amount of matching of features within an overlap area resulting from displacing the images from one another in accordance with one or more candidate offset vectors.

Once the matching pairs of images are identified, and a best offset vector is determined for each of the matching pairs of images, the controller 110 may forward the matching pairs of images and associated data, or data corresponding to the matching pairs of images to the global matching module 130. The global matching module 130 may be adapted to identify at least a triplet (groups of three) of matching pairs of images whose best offset vector sum is approximately zero (blocks 250). The global matching module 130 may then globally match the pairs of matching images to one another in accordance with the pairs' best offset vectors (blocks 260). According to some embodiments of the invention, once the global matching module 130 identifies at least one triplet of pairs of matching images, the global matching module 130 may begin to form a cluster of globally matching images by globally matching additional images from the remaining images to the cluster. The global matching module 130 may be configured to globally match images to the cluster based upon at least a best offset vector between a locally matched pair of images which includes an image to be added to the cluster and an image (one or more) already globally matched to the images in the cluster (an image which is already part of the cluster of globally matched images). Thus, according to some embodiments of the invention, the global matching module 130 may provide a substantially consistent geometrical representation of at least a portion of the fundus.

According to some embodiments of the present invention, the global matching module 130 may be configured to globally match images to the cluster of globally matching images based upon the (local) matching of features from an image to be added to the cluster and one or more images already in the cluster. Thus, a cluster of globally matching images may initially include the three images corresponding to the three pairs of locally matched images whose offset vector sum is approximately zero, and may be gradually increased by globally matching additional images to the cluster. The global matching of images shall be described in greater detail hereinbelow.

Figure 3:
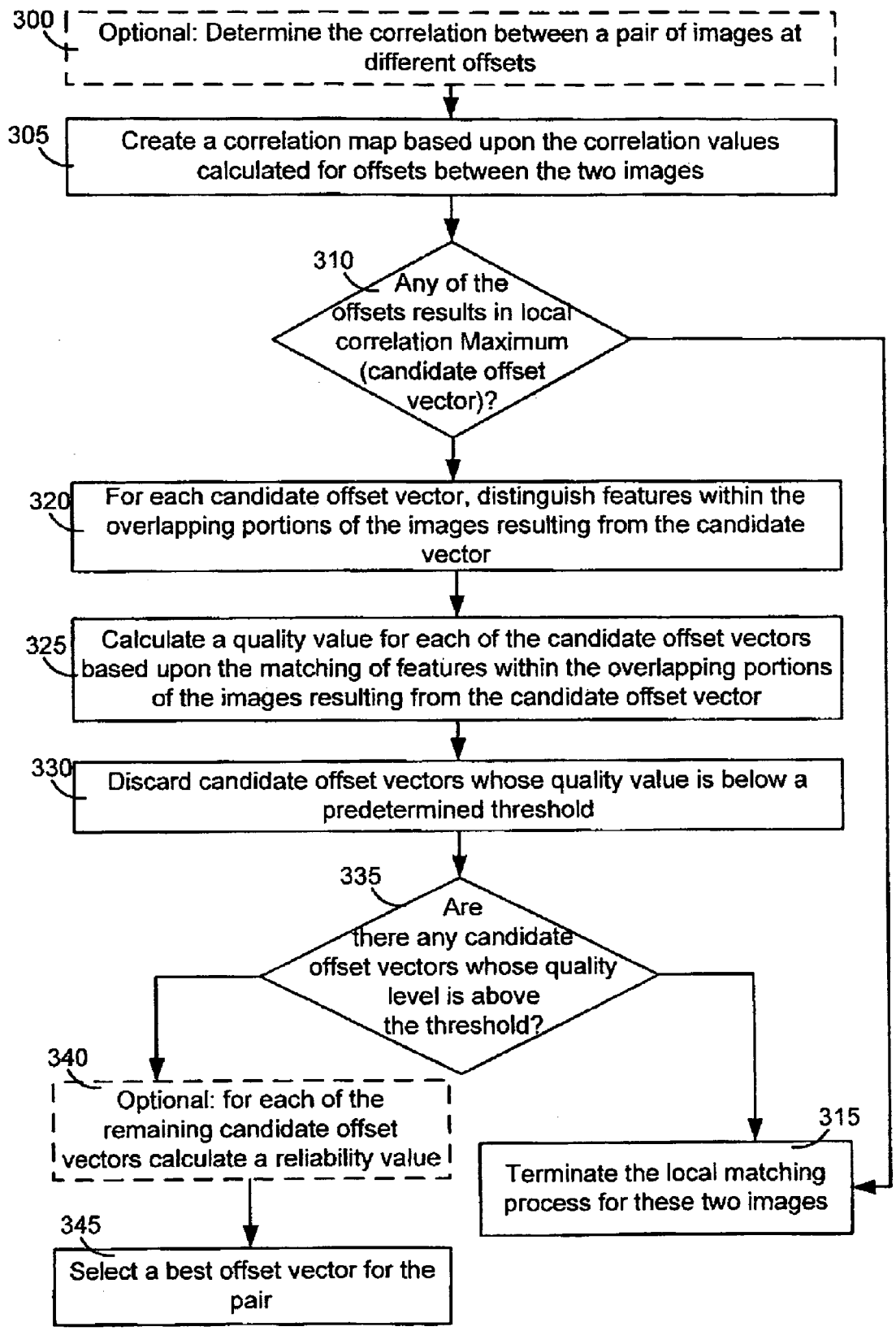
FIG. 3 is a flowchart illustration of a process of locally matching pairs of images, according to some embodiments of the present invention.

Reference is now made to FIG. 3, which is a flowchart illustration of a process of locally matching pairs of images, according to some embodiments of the present invention. As mentioned above, the local matching module 120 may receive a plurality of images collectively corresponding to at least a portion of the fundus, wherein at least some of the images overlap. Upon receiving the images, the local matching module 120 may be adapted to determine the correlation between a pair of images at different offsets (block 300). Here, a pair of images relates to any possible combination of two images from the plurality of images received at the local matching module 120, however, according to some embodiments of the invention, local matching may be tested for only some pairs of images, for example, only for images which the operator indicated may be a possible match. According to some embodiments of the invention, the correlation between two images may be calculated for only certain offsets, whereas for others not. This and other factors of the correlation between the images may be determined in accordance with a predefined correlation policy. The correlation policy may be based upon predefined criteria, such as accuracy level and speed, for example. The correlation policy may be part of a local matching and/or global matching policy and may be modified from time to time, for example, based upon input from the operator, or in accordance with another example, based upon statistical performance data.

A correlation between a pair of images as used herein is a mathematical measure of the similarity between the images at different offsets. Various image-processing cross-correlation methods are known for measuring the similarity of images. One example of an image-processing cross-correlation method, which may be used as part of some embodiments of the present invention, is provided below. According to further embodiments of the present invention, a feature enhancement image-processing technique may also be implemented as part of some embodiments of the invention. The feature enhancement technique may provide only the significant artifacts within each image. The cross-correlation process may be performed in respect of the identified significant features, such that the result is more decisive. The feature enhancement image-processing technique described herein is based upon the gradient modulo of the images; however, some embodiments of the present invention are not limited in this respect and any other feature enhancement image-processing technique may be used in accordance with some embodiments of the invention. For example, a gradient of an image may denoted by:

$$|\nabla I| = \sqrt{(\partial_x I)^2 + (\partial_y I)^2} \quad \text{(Eq. 1)}$$

and the correlation between the images may be in accordance with:

$$C_{I,J}(x, y) = \frac{\sum_{i,j} |\nabla I|(i+x, j+y) \cdot |\nabla J|(i, j)}{\sqrt{\sum_{i,j} (|\nabla J|(i, j))^2} \sqrt{\sum_{i,j} (|\nabla I|(i, j))^2}} \quad \text{(Eq. 2)}$$

wherein $C_{I,J}(x,y)$ is the correlation between images I, J when I is displaced from J by (x,y). Thus, for each pair of images, given a certain set of offset vectors (represented by a set of (x,y) coordinates in this case), a correlation value may be computed for each of the offset vectors. A high correlation value—$C_{I,J}(x,y)$ (the maximum is 1) may suggest high similarity between the images (at a certain offset). However, according to some embodiments of the invention, a high correlation value—$C_{I,J}(x,y)$ is not conclusive evidence of a similarity between the images. According to some embodiments of the present invention, in order to increase computational efficiency, the correlation may be computed by Fast Fourier transform (FFT). It should be noted that this is only an example of a technique which may be used as part of some embodiments of the invention for determining the correlation between a pair of images, and that according to further embodiments of the present invention, any suitable technique may be used by the local matching module 120 to determine the correlation between each pair of images at each offset vector.

Figure 4:
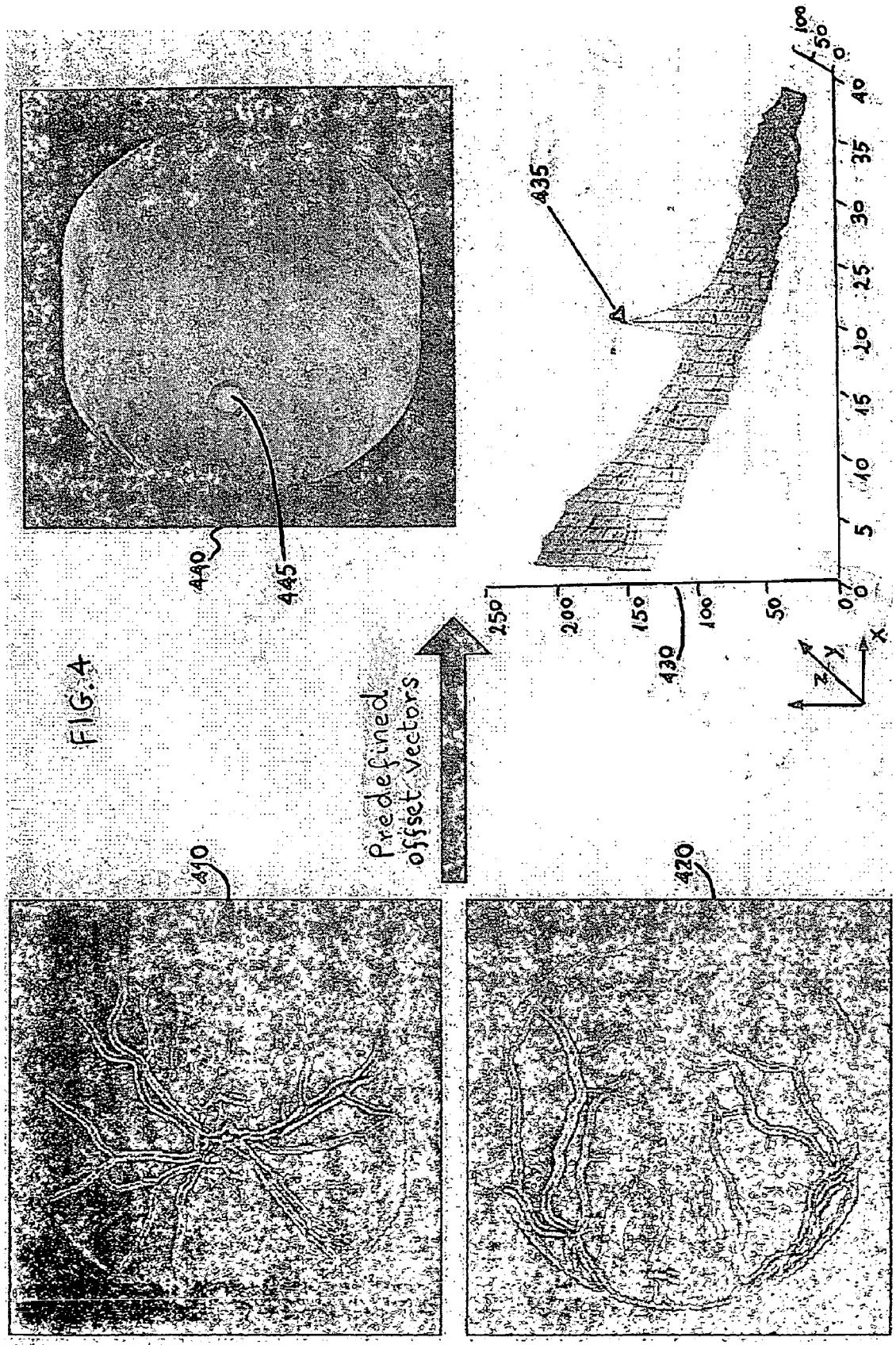
FIG. 4 is an illustration of a pair of gradient modulus images corresponding to a pair of partially overlapping images of a fundus and a three-dimensional (3-D) graphical representation of the correlation between the pair of gradient modulus images when offset from one another in accordance with the set of offset vectors, and also of a correlation map image equivalent to the 3-D graphical representation.

According to some embodiments of the present invention, the local matching module 120 may create a correlation map based upon the correlation values calculated for offsets between the two images (block 305). Reference is now additionally made to FIG. 4, which shows a pair of gradient modulus images 410 and 420 corresponding to a pair of partially overlapping images of a fundus and a three-dimensional (3-D) graphical representation 430 of the correlation between the pair of gradient modulus images 410 and 420 when offset from one another in accordance with the set of offset vectors, and also of a correlation map image 440 equivalent to the 3-D graphical representation 430. In the 3-D graphical representation 430 the x, y axes correspond to the offset vector used to offset the images. Here, for convenience, gradient modulus image 420 is offset in relation to static gradient modulus image 410. The z axis provides the correlation value at each x, y coordinate.

Once the correlation between each pair of images at the various offsets is determined, the local matching module 120 may be adapted to determine whether any of the offsets results in local correlation maximum (block 310). A local correlation maximum is received when the correlation between the two images at a certain relative displacement therebetween is substantially higher than the correlation between the images at near or close displacements. For example, in the 3-D graphical representation 430, apex 435 is a local correlation maximum provided by an offset vector associated with the X, Y offset coordinates of the apex point 435. In the correlation map image 440 high intensity point 445 is a point of local maximum intensity, which represents a local maximum correlation value (point 445 is associated with the X,Y offset coordinates of apex point 435). According to some embodiments of the invention, an offset vector associated with a relative displacement resulting in local correlation maximum is defined as a candidate offset vector. It would be appreciated, that a local maximum may be determined in accordance with various predefined criteria. Various techniques are known for determining a local maximum, and according to some embodiments of the present invention, any suitable technique for determining a local maximum may be used.

It will be appreciated that while there may be various other offset coordinates which provide substantially high correlation values, and even higher values than the correlation value at a local maximum, a high correlation alone is not necessarily a good indication of a correct offset between a pair of partially overlapping images. For example, as can be seen in the correlation map image 440 high correlation values are received at the top portion of the map image 440. However, in this case the high correlation value is not a good indication of a correct offset between the images, since the top portion of the map image 440 corresponds to a relatively small overlapping area, and the high correlation value is indicative of a good correlation which is associated with only a relatively small area (the correlation function represented by Eq. 2 is normalized for area). On the other hand, point of high intensity 445 corresponds to a relatively high correlation which is associated with a substantially larger area. Since point 445 is also indicative of significantly higher correlation at the offset vector associated with point 445 than the correlation at adjacent offset vectors (which correspond to near offsets), it provides a relatively good indication of a correct offset between the pair of images. However as mentioned above, a local maximum correlation is not conclusive evidence of a correct offset, and further criteria may be applied according to the present invention to determine whether the pair of images is a matching pair of images and to determine its best offset vector, as will be described in detail below. Using the local maximum as the criteria for selecting candidate offset vectors may increase the efficiency of the local matching process without paying a significant penalty in terms of its quality.

It would be appreciated that the process of selecting the one or more candidate offset vectors is, according to some embodiments of the invention, optional and may be omitted. However, it should also be noted that eliminating offset vectors from the initial set of offset vectors based upon the correlation of the images at each offset, may contribute to the process of locally matching the images as a whole, and may increase its efficiency and speed.

In case it is determined, that for a certain pair of images, none of the initial offset vectors results in a correlation maximum, the local matching process for that or these pair or pairs may be terminated (block 315). Such pairs may include, for example, non-overlapping pairs and may be marked as such by the local matching module 120. The process of locally matching a pair of images may continue only for those pairs having at least one candidate offset vector. For each candidate offset vector, the pair of images associated with the candidate vector may be analyzed to distinguish features within the overlapping portions resulting from the candidate vector (block 320). Reference is now made to FIG. 5, which is a block diagram illustration of some aspects of an analysis of a gradient modulo of at least a portion of an image. According to some embodiments of the invention, a gradient modulo is calculated as part of the feature matching process. According to further embodiments of the invention, the gradient modulo is calculated for each overlapping portion of an image which overlaps with another portion of another image when the two images are offset from one another in accordance with a candidate offset vector. For example, in FIG. 5 and according to some embodiments of the invention, the gradient modulo is calculated for a portion 505 of a first image 500 which overlaps with a portion of a second image (not shown) when the two images are displaced from one another in accordance with a candidate offset vector. According to some embodiments of the invention, the gradient modulo image is created for the purpose of distinguishing artifacts or control points within the overlapping portion. According to further embodiments of the invention, the gradient modulo image may be used to identify features within the overlapping portion, as is described in further detail below.

According to some embodiments of the invention, initially, as part of the analysis of the gradient modulo image, a set of control points 520-540 are located. According to some embodiments of the invention, the criterion for selecting the control points 520-540 may be the high value of the gradient at a certain points in the image. The points may be selected for their potential to contain correlative information. Thus, according to some embodiments of the invention, the criterion for selecting a control point may at least correspond to the point's gradient value. For example, the criterion for selecting a control point may include a threshold, and any point within the overlap area which is associated with a gradient whose modulo is above the threshold may be determined to be a control point. The spatial characteristics of a control point may be predefined. For example, the spatial characteristics of a control point may correspond to the minimal or average size (or some function thereof) of features which may have a clinical significance. According to some embodiments of the invention, once the control points are identified, features are distinguished. A feature may correspond to one or more control points. For example, in case a plurality of control points are within a certain distance from one another they maybe determined to collectively be part of one feature. However, in accordance with other embodiments of the invention, each control point may be regarded a distinct feature.

According to some embodiments of the invention, once the control points 520-540 are identified, each control point or each feature may be further analyzed to determine whether it is has some clear directionality. A control point is determined to have a clear directionality in accordance with at least a predefined criterion. An example of a predefined criterion which may be used for determining whether a control point has clear directionality shall be provided below. It would be appreciated that in the context of fundus imaging, artifacts, such as blood vessels and nerves, typically have a relatively clear directionality. Thus, checking the control points or features for directionality and using this information at the matching stage, may improve the reliability of the feature matching.

For illustration purposes in FIG. 5 we focus on control point 520. In FIG. 5 control point 520 is part of feature 510, represented by control points 520-540. In accordance with some embodiments of the invention, as part of determining whether a certain control point, in this case control point 520, has some clear directionality, a match response filter 550A-C with rotated line as kernel elements (550A, 550B and 550C) may be computed. The maximal response of the filter 550A-C gives the direction vector at the control point 520. If the maximal response is weaker then a predefine value, the point being examined is considered to have no directionality. The directionality of each control point of feature is recorded.

Based upon the matching of the features within the overlapping portions of the images resulting from each of the candidate vectors, a quality value may be calculated for each of the candidate offset vector(s) (block 325). This process is performed for each pair of images having at least one candidate vector and for each candidate vector (in case there is more than one for a certain pair). According to some embodiments of the present invention, as part of the matching of the features within the overlapping portions of the images resulting from a certain candidate offset vector, the features from an overlapping portion of a first image of a certain pair are matched with features within the overlapping portion of a second image of that pair.

According to some embodiments of the invention, in order to determine whether a feature from an overlapping portion of a first image of a certain pair and a feature from an overlapping portion of a second image of the pair are matching features, an image-processing cross-correlation technique may be used for example, Eq. 2 may be utilized:

$$C_{I,J}(x, y) = \frac{\sum_{i,j} |\nabla I|(i+x, j+y) \cdot |\nabla J|(i, j)}{\sqrt{\sum_{i,j} (|\nabla J|(i, j))^2} \sqrt{\sum_{i,j} (|\nabla I|(i, j))^2}} \quad \text{(Eq. 2)}$$

wherein, here I, J are the two features and (x, y) represent the relevant candidate offset vector. According to some embodiments of the present invention, matching features may be defined to be features whose correlation score $C_{I,J}(x,y)$ is above a predefined value. The correlation may be calculated for each two features from the pair of images and for all the features distinguished for each candidate offset vector.

Next, a quality value for each candidate offset vector of each pair of images is calculated based upon all the matching features within the overlap area resulting from that candidate offset vector (blocks 340). The quality value is calculated in accordance with a score function. To estimate a candidate offset vector, first the candidate offset vector is projected on a line perpendicular to the directionality of the relevant feature:

$$\vec{v}_i = \vec{v}_i - \vec{d}_i(\vec{v}_i \cdot \vec{d}_i) \quad \text{(Eq. 3)}$$

wherein $\vec{d}_i$ denotes the unit vector in direction of the feature (in case of no directionality $\vec{d}_i=0$), and $\vec{v}_i$ denotes the local offset vector of the feature. It would be appreciated that Eq. 3 may provide for the elimination of offset values corresponding to a correlation in parallel direction to $\vec{d}_i$. It would be further appreciated that, according to some embodiments of the invention, correlation in parallel direction may be meaningless (because at this direction correlation may be equivalent to moving along a line). Then, the score is computed by:

$$s = \frac{1}{N} \sum_{|p_i - p_j| \leq D} |v_i - v_j|, \quad \text{(Eq. 4)}$$

where $p_i$, $p_j$ are feature points being matched, D is a predetermined distance parameter corresponding to a certain threshold distance between any two feature points being matched and $v_i, v_j$ are offset vectors. Thus, according to some embodiments of the invention, a quality value of a certain candidate offset vector corresponds to average difference between offset vectors of control points which are within a predefined distance from one another.

Next, candidate offset vectors whose quality value is below a predetermined threshold may be discarded (block 330). It would be appreciated that candidate offset vectors scoring a relatively low quality value are ones which provide a relatively poor matching of features within the overlapping portions of the images resulting from the candidate offset vector, and are therefore not likely to provide a locally matching pair of images.

After the candidate offset vectors whose quality value is below the predetermined threshold are eliminated, the local matching module 120 may check whether there are any candidate offset vectors left (block 335), or in other words, if there are any candidate offset vectors whose quality value is above the predetermined threshold. If for a certain pair of images there are no candidate offset vectors left, the local matching process for that pair of images is terminated (block 315). According to some embodiments of the invention, typically, a pair of images for which none of the offset vectors scored a quality value which is above the predefined threshold are regarded as non-overlapping. The local matching module 120 may mark pairs of images for which none of the offset vectors scored a quality value which is above the predefined threshold as being non-overlapping.

If it is determined however, that for a certain pair of images there is at least one candidate offset vector whose quality value is above the predetermined threshold, that pair of images is determined to be a matching pair of images. If for a certain pair of images there is only one offset vector whose quality value is above the predetermined threshold, that offset value is selected as the best offset vector for that pair of matching images. However, if for a certain pair of images there are two or more offset vectors whose quality value is above the predetermined threshold one of the remaining offset vectors may be selected in accordance with a predefined criterion. For example, as part of selecting a best offset vector a reliability value may be calculated for each of the remaining offset vectors (block 340). According to some embodiments of the invention, the reliability value may correspond to the amount of matching features within the overlap area resulting from each of the relevant offset vectors (the candidate offset vectors whose quality value is above the predetermined threshold). According to further embodiments of the invention, the reliability value may correspond to the amount of control points used to calculate the quality value, such that the offset vector resulting in the largest number of control points is determined to be the most reliable and is selected as the best offset vector for a certain pair of images. Thus, for each matching pair of images, the offset vector having the highest reliability score is selected as the best offset vector for that pair (block 345).

The output of the local matching module 120 with respect to two images may include data with respect to a best offset vector between the images or an indication that the two images are not considered to be overlapping. According to some embodiments of the invention, in case a plurality of pairs of images are received at the local matching module 120, the output of the local matching module 120 may be a matrix created based upon the best offset vector of each pair of images which is determined to be partially overlapping. According to further embodiments of the invention, the controller 110 may be adapted to cause data corresponding to the locally matching pairs of images as well as the quality value of the best offset vector of each matching pair of images to be stored, as well as data with respect to the control points ($\vec{p}_n$) within the overlapping portions of the locally matched images.

Once the local matching module 120 completes the local matching process, data with respect to each of the locally matching pairs may be fed to the global matching module 130. As part of the data corresponding to each matching pair, the global matching module 130 may receive data corresponding to at least the best offset vector of each of the matching pairs. Based upon the data corresponding to the matching pairs of images and according to the best offset vector of each matching pair, the global matching module 130 may identify at least a triplet of matching pairs of images whose best offset vectors sum (the sum of the three matching pairs' offset vectors) is substantially zero. According to further embodiments of the present invention, the global matching module 130 may identify at least a triplet of matching pairs of images whose best offset vectors sum is below a predetermined threshold. According to yet further embodiments of the present invention, the predetermined threshold may be close to zero. For example, the order of the predetermined threshold may be determined at least based upon an estimation with respect to the distortions associated with a planar representation of a spherical surface. The threshold value may be selected in a manner to accommodate for a variety of such distortions associated with a planar representation of a spherical surface. For example, the threshold value may correspond to the maximum distortion associated with the planar representation of the spherical surface.

Reference is now made to FIG. 6 which is a block diagram illustration of three images 610, 620 and 630 constituting a triplet of matching pairs of images whose best offset vectors' 615, 625 and 635 sum is substantially zero and of an additional image 640 which is being globally matched to the globally matched images. According to some embodiments of the present invention, once the global matching module 130 may be adapted to identify at least a triplet of locally matching pairs of images 610, 620 and 630, and in case there are additional images, or whenever an additional image is added, the global matching module 130 may be adapted to attempt to globally match more images to the already globally matched images. The global matching module 130 may be adapted to globally match (or not) additional images to the globally matched images in accordance with predefined criteria, as will be described in greater detail below.

According to some embodiments of the invention, the global matching module 130 may be configured to select the root of the globally matched images to be the center of one of the images from the initial triplet 610, 620 and 630. For example, according to some embodiments of the invention, the global matching module 130 may be adapted to select the root to be the center of an image whose average quality value with its locally matching images is the highest.

The global matching module 130 may be configured to globally match images around the cluster based upon the matching of features from the remaining images (images which are not already globally matched to the cluster) with the images in the cluster. According to further embodiments of the invention, the global matching module 130 may be adapted to globally match images to one another based upon data received from the local matching module 120 with respect to a local matching between pairs of images. According to further embodiments of the invention, the global matching module 130 may be adapted to globally match images to one another based upon data received from the local matching module 120 with respect to a local matching between an image which is already globally matched and another image which is not yet globally matched and which is currently being globally matched. The global matching of an additional image to the images already globally matched may be performed based upon a best offset vector of a matching pair which corresponds to the additional images and one of the images already globally matched. Thus, a cluster of globally matching images may initially include the three images corresponding to the three pairs of images and may be increased by globally matching additional images to the cluster.

According to some embodiments of the present invention, the global matching module 130 may be configured to globally match to the cluster one or more of the remaining images which provide a locally matching pair with at least one of the images already in the cluster (and which are thus globally matched to the other images in the cluster). For example, image 640 constitutes a locally matching pair with images 610 and 630 which are already in the cluster. According to some embodiments, the global matching module 130 may be adapted to add, each time, the image whose best offset vector with one or more of the images already in the cluster provide(s) the best quality score. In case that a certain image constitutes a matching pair with more than one image in the cluster, its offset vectors' quality score may be combined, averaged, factorized, etc. as may be determined, for example, during configuration. In the scenario shown in FIG. 6, the average quality value of image 640 vis-à-vis images 610 and 630 already in the cluster is the highest and therefore it is added to the cluster. Alternatively, in accordance with further embodiments of the invention, the global matching module 130 may simultaneously receive from the local matching module 120 data with respect to all the locally matching pairs of images, for example, in bulk, and upon receiving the data, the global matching module 130 may be adapted to calculate a cluster of globally matched images including the plurality of locally matching pairs of images in accordance with the logic discussed herein.

According to some embodiments of the present invention, in case more than one triplet of matching images whose best offset vectors sum is substantially zero (or under the predetermined threshold) are identified, then if at least one image from a first triplet is matched with at least one image in the second triplet, these two triplets may be globally matched and may become part of the same cluster. For example, as is shown in FIG. 6, images 610, 620 and 630 which form a first triplet of images and image 620, 630 and 640 which form a second triplet of images are globally matched to one another, thereby forming a single cluster. However, if none of the images from the two clusters have at least one matching pair of images, then the two clusters may remain globally independent from one another. The same applies to any number of triplets.

It should be noted that although the present invention provides a device and a method of enabling an automatic global matching of a plurality of images to provide a consistent planar representation of the fundus, the present invention is not limited in being a fully automatic process rather, according to some embodiments of the present invention, some of the process described above as being part of the present invention may be performed manually or semi-automatically and/or may be incremental.

Figure 7A:
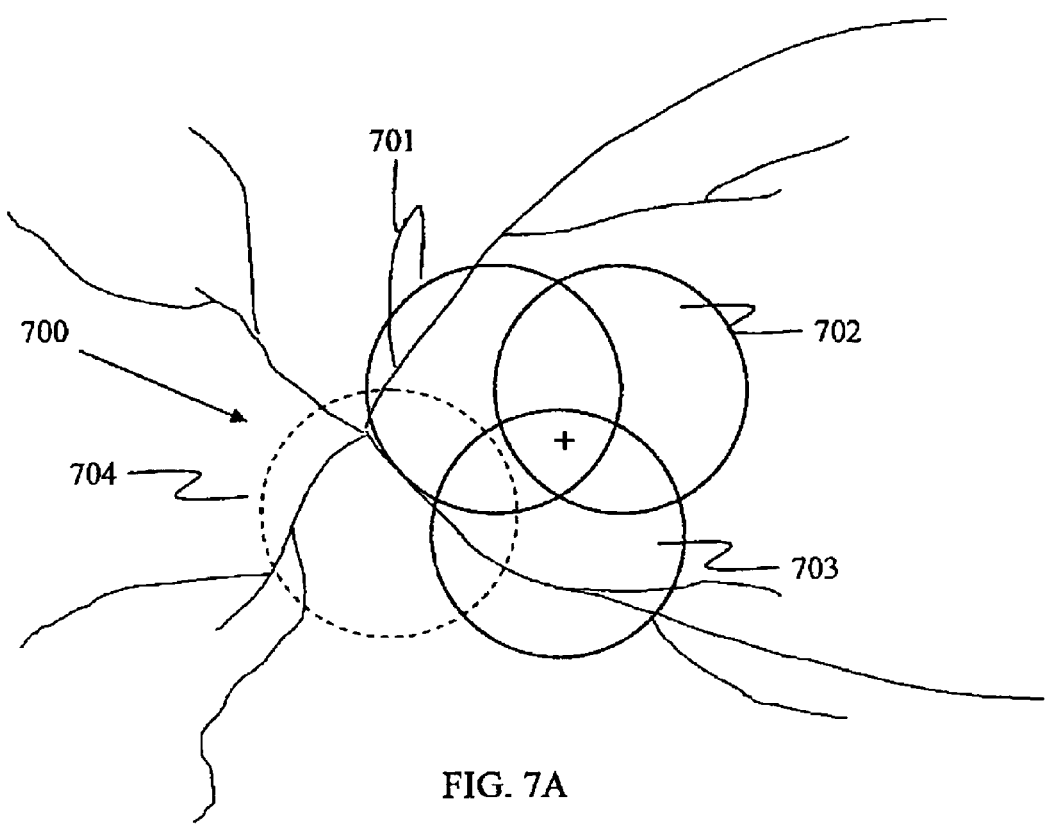
FIG. 7A and FIG. 7B are illustrations of certain aspects of a process of global matching a plurality of images during an incremental mode of a device for enabling an automatic global matching of a plurality of images, according to some embodiments of the invention.
Figure 7B:
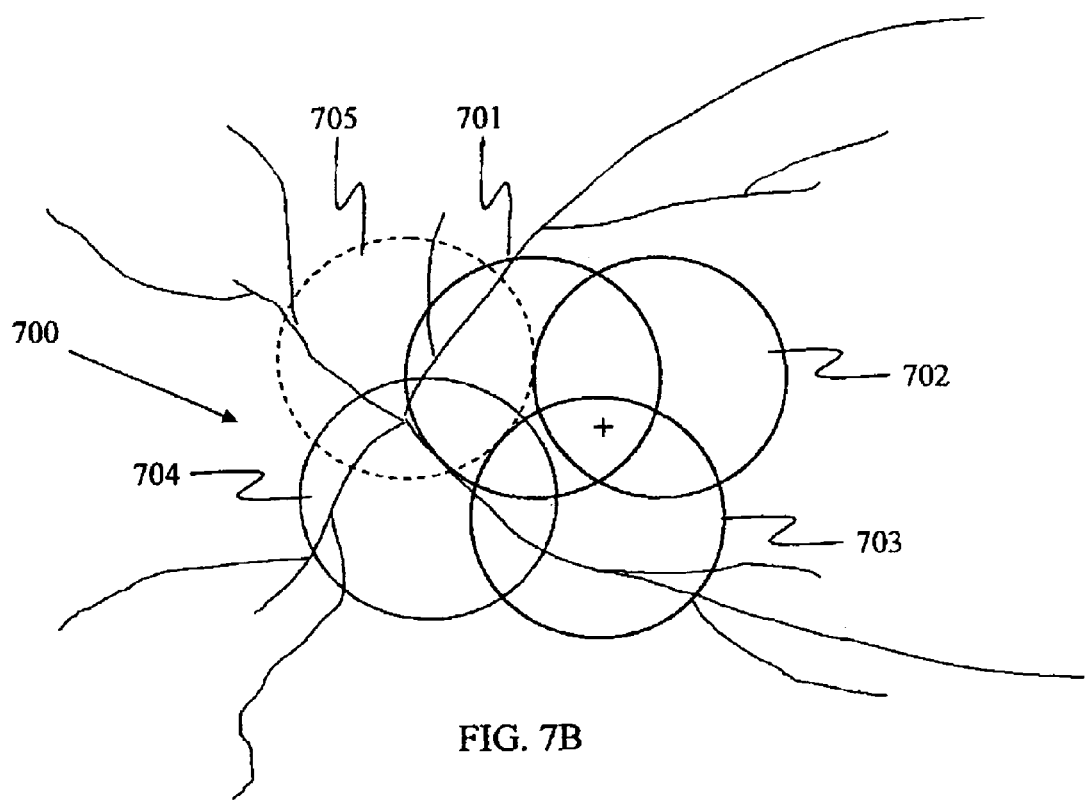

Reference is now made to FIG. 7A and FIG. 7B, which are illustrations of certain aspects of a process of global matching a plurality of images during an incremental mode of a device for enabling an automatic global matching of a plurality of images, according to some embodiments of the invention. For example, according to some embodiments of the invention, initially three (or more) images constituting (at least) a triplet of matching pairs of images whose best offset vectors sum is substantially zero may be provided to the device 100. In FIG. 7A, the three initial images correspond to areas 701, 702 and 703 on a patient's fundus. The images constituting the triplet of matching pairs of images whose best offset vectors sum is substantially zero may be provided to the device 100 in series or together, in parallel. Upon receiving at least the triplet of images, the local matching module 120 and the global matching module 130 may be utilized to provide a cluster of globally matched images which is comprised of at least the three pairs of images. According to further embodiments of the invention, the three or more initial images provided to the device 100 may be locally matched and globally matched in advance.

Once the cluster of globally matched images is created (or provided), an additional image may be provided to the device 100. For example, an image corresponding to area 704 of the patient's fundus may be provided. Upon receiving the additional image, the device 100 may utilize the local matching module 120 to determine whether the additional image provides a matching pair with at least one of the images already in the cluster. In case it is determined that the additional image provides a matching pair with at least one of the images already in the cluster, data with respect to the additional image is provided to the global matching module 130, including, for example, data with respect to the best offset vector of the image with its matching pair, and the global matching module 130 may globally match the additional image to the images which are already globally matched to one another. As discussed above, the global matching module 130 may globally match the additional image to the globally matched cluster based upon the image's best offset vector in respect of one or more of the images in the cluster. The global matching module 130 may also use data in respect of the matching of features from an overlapping portion of the additional image with features from an overlapping portion of its matching image(s) in the cluster to determine the additional image's global (and relative) location. Otherwise, if the additional image does not provide a locally matching pair with any of the images already globally matched with the other images, the global matching process with respect to the additional image is terminated. According to some embodiments of the invention, after the process ends in respect of a certain image, the process may be repeated from yet another image, for example, an image corresponding to area 705 of the patient's fundus may be provided, and the process may be repeated for the next additional image.

According to some embodiments of the invention, as part of adding an additional image to the cluster of globally matched images, the relative position of the images within the cluster may be adjusted. For example, according to some embodiments of the invention, the relative position of the images within the cluster may be adjusted when the quality value of a best offset vector(s) between an images in the cluster and an additional image to be added to the cluster is higher than the quality value of the best offset vector(s) between the images belonging to the cluster and another image already in the cluster.

In accordance with another example, whenever an additional image is received at the device 100, the local matching process and/or the global matching process may be recalculated for each image including the additional image vis-à-vis one or more of the other images in the cluster of images which have already been globally matched. Thus, the cluster of global matching images may be reformed in accordance with the local matching of the additional image with one or more of the images which were already (before the additional image was received) part of the cluster.

It will also be understood that the system according to the invention may be a suitably programmed computer. Likewise, some embodiments of the invention contemplate a computer program being readable by a computer for executing a method in accordance with some embodiments of the invention. Further embodiments of the invention contemplate a machine-readable memory tangibly embodying a program of instructions executable by the machine for executing a method in accordance with some embodiments of the invention.

Throughout the specification and the claims the terms "accurate montage", "substantially accurate montage" or the like, unless stated otherwise, shall be used to mean any montage of images which substantially accurately represents the object or the surface which is sought to be represented by the montage.

Throughout the specification and the claims the term "spherical montage" "substantially spherical montage" or the like, unless stated otherwise, shall be used to mean any montage of images comprised of a plurality of globally matching images correctly positioned on a spherical surface substantially similar to the surface of the fundus. It would be appreciated that a montage of images which is comprised of a plurality of locally and globally matching images correctly positioned on a spherical surface may provide a substantially accurate representation of the surface of the fundus or of a portion thereof which the images collectively represent.

Figure 8:
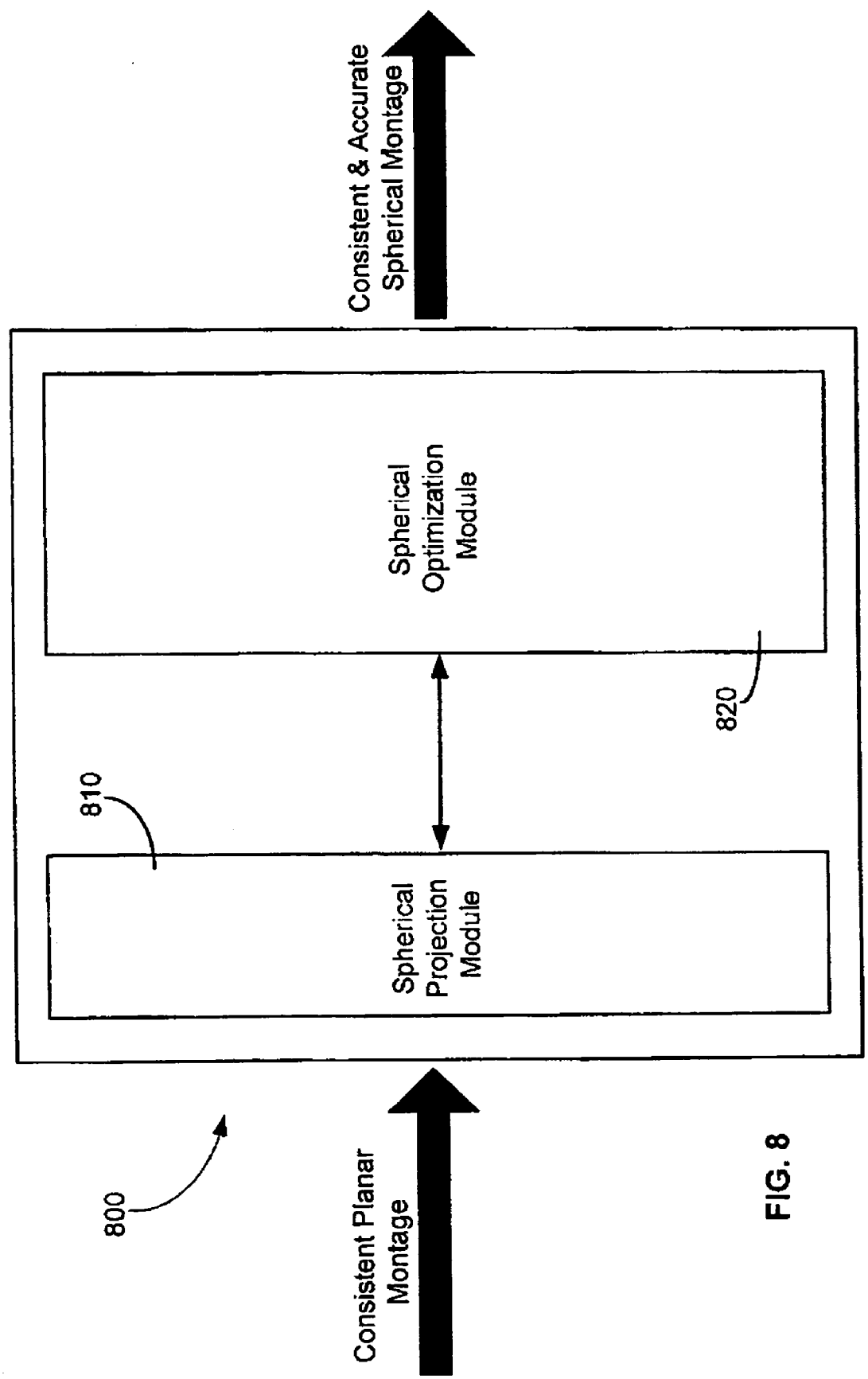
FIG. 8 is a block diagram illustration of a device for providing a consistent spherical montage substantially accurately representing a fundus, in accordance with some embodiments of the present invention.

Reference is now made to FIG. 8, which is a block diagram illustration of a device for providing a consistent spherical montage substantially accurately representing a fundus, in accordance with some embodiments of the present invention. The device for creating a consistent spherical montage substantially accurately representing a subject's fundus 800 may include a projection module 810 and a spherical optimization module 820. The projection module 810 and the spherical optimization module 820 may be operatively connected to one another.

Figure 9:
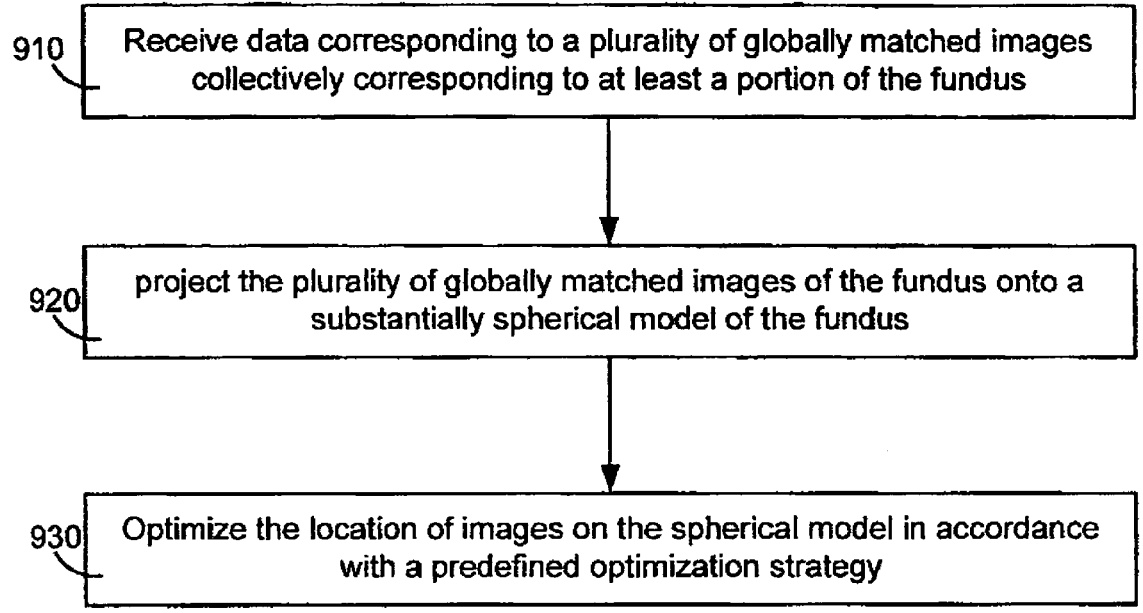
FIG. 9 is a flowchart illustration of a method of creating a consistent spherical montage substantially accurately representing a subject's fundus, in accordance with some embodiments of the present invention.

Reference is now additionally made to FIG. 9, which is a flowchart illustration of a method of creating a consistent spherical montage substantially accurately representing a subject's fundus, in accordance with some embodiments of the present invention. Initially, data corresponding to a plurality of globally matched images collectively corresponding to at least a portion of the fundus may be received at the device 100 (block 910). According to some embodiments of the invention, the plurality of globally matched images may provide a substantially consistent geometrical representation of at least a portion of the fundus. According to further embodiments of the invention, the input data may correspond to the relative positions on a plane of a plurality of globally matched images. The plurality of globally matched images may be part of one or more clusters of globally matched images, wherein each cluster includes a plurality (three or more) of globally matched images. According to some embodiments of the invention, the consistent planar representation may be obtained by utilizing the method of enabling an automatic global matching of a plurality of images to provide a substantially consistent planar representation of the fundus described above and/or the device for enabling an automatic global matching of a plurality of images described above may be used to provide the plurality of globally matched images. However, further embodiments of the invention may not be limited in this respect, and any suitable method or technique and any suitable device or system may be used for creating and providing the consistent planar representation, including but not limited to, manual local and global matching of images, for example.

Once received at the device 800, the data corresponding to the consistent planar representation of the fundus may be fed to the projection module 810. The projection module 810 may be adapted to project the plurality of globally matched images of the fundus onto a substantially spherical model of the fundus (block 920). According to some embodiments of the invention, the projected images model may provide an initial spherical representation of the fundus or of a portion of the fundus. According to some embodiments of the invention, the projection module 810 may be configured to project to plurality of images onto a predefined spherical model of a fundus.

According to some embodiments of the invention, the projection module 810 may be adapted to implement a predefined spherical mapping policy. In accordance with further embodiments of the invention, the projection module 810 may be adapted to position the plurality of images on a predefined spherical model of a fundus in accordance with a predefined spherical mapping policy and/or a predefined spherical projection model. According to some embodiments of the invention, the projection module 810 may be adapted to adjust one or more of the plurality of images based upon a predefined spherical mapping policy and/or a predefined spherical projection model. According to one embodiments of the invention, adjusting an image may include modifying the visual appearance of one or more features within the image. According to some embodiments of the invention, the spherical projection model may be based upon one or more of the following: a predefined geometrical model of a fundus; initial optical characteristics of an imaging system used to generate the images; and initial relative position of the imaging system and the fundus. The initial parameters associated with the spherical mapping policy and/or with the spherical projection model may be preliminary, starting point, parameters which may be used to generate an initial spherical representation. As will be discussed in further detail below, according to some embodiments of the invention, the initial parameters associated with the spherical mapping policy and/or with the spherical projection model may be adjusted or modified during optimization, as will be described in further detail below.

In accordance with further embodiments of the present invention, as part of the projection of the planar representation of the fundus onto the spherical model, the projection module 810 may be adapted to modify the relative position of one or more of the input images and/or the projection module 810 may be adapted to adjust one or more of the images associated with the planar representation of the fundus. According to some embodiments of the invention, the changes implemented by the projection module 810 may be intended, for example, to accommodate for the transformation from a planar representation to a spherical representation. Further aspects of the projection of the planar representation onto the spherical model of the fundus shall be described in greater detail hereinbelow.

In accordance with some embodiments of the present invention, the initial spherical representation of the fundus, which corresponds to the projected planar representation of the fundus, may be input to the spherical optimization module 820. The spherical optimization module 820 may be configured to optimize the initial spherical representation in accordance with a predefined optimization strategy in order to obtain a substantially accurate spherical montage (or collage) representing at least a portion of a photographed fundus (block 930). After block 920, the initial spherical representation of the fundus may not be satisfactorily consistent and/or accurate, for example, due to various differences between a planar representation of the fundus and a spherical representation of the fundus. These differences are typically unknown when projecting the planar representation of the fundus onto the spherical model, but are not necessarily so. Thus, after the planar representation of the fundus has been projected onto the spherical model of the fundus and the initial spherical representation is received, some further optimization may be required in order to obtain a substantially accurate spherical representation of the fundus. For example, the relative position of one or more of the images within the initial spherical representation may be modified and/or one or more of the images in the initial spherical representation may be adjusted (adjusting an image may include, for example, modifying the visual appearance of a feature within the image).

It should be noted that, in accordance with some embodiments of the present invention, the substantially accurate spherical montage may represent only a portion or portions of a subject's fundus and not necessarily the entire fundus. Furthermore, in accordance with some embodiments of the present invention, the spherical montage may be created from a planar representation of only a portion or portions of the fundus rather than of the entire fundus.

Figure 10:
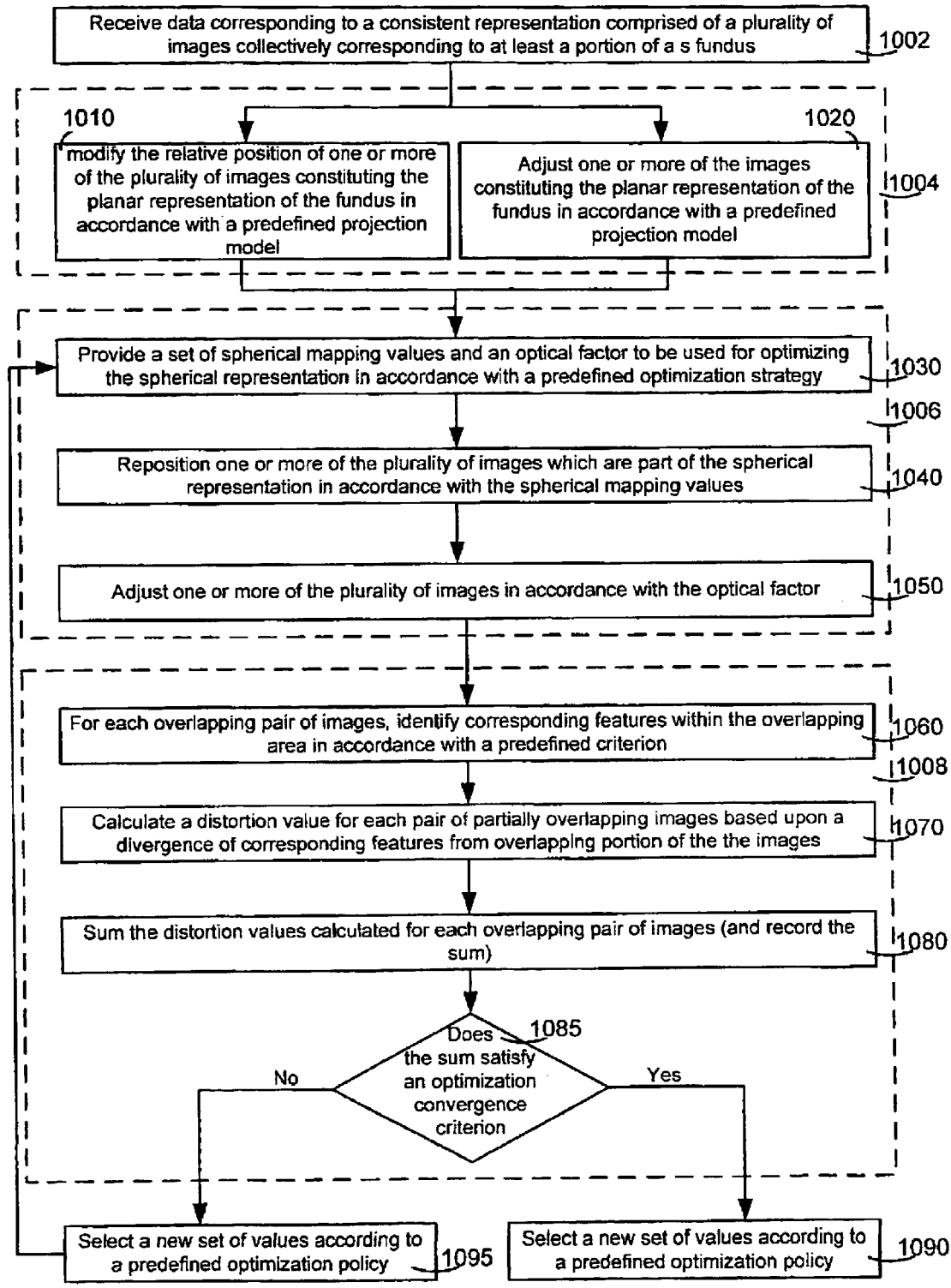
FIG. 10 is a flowchart illustration of a method of creating a consistent spherical montage substantially accurately representing a subject's fundus, according to further embodiments of the present invention.
Figure 11:
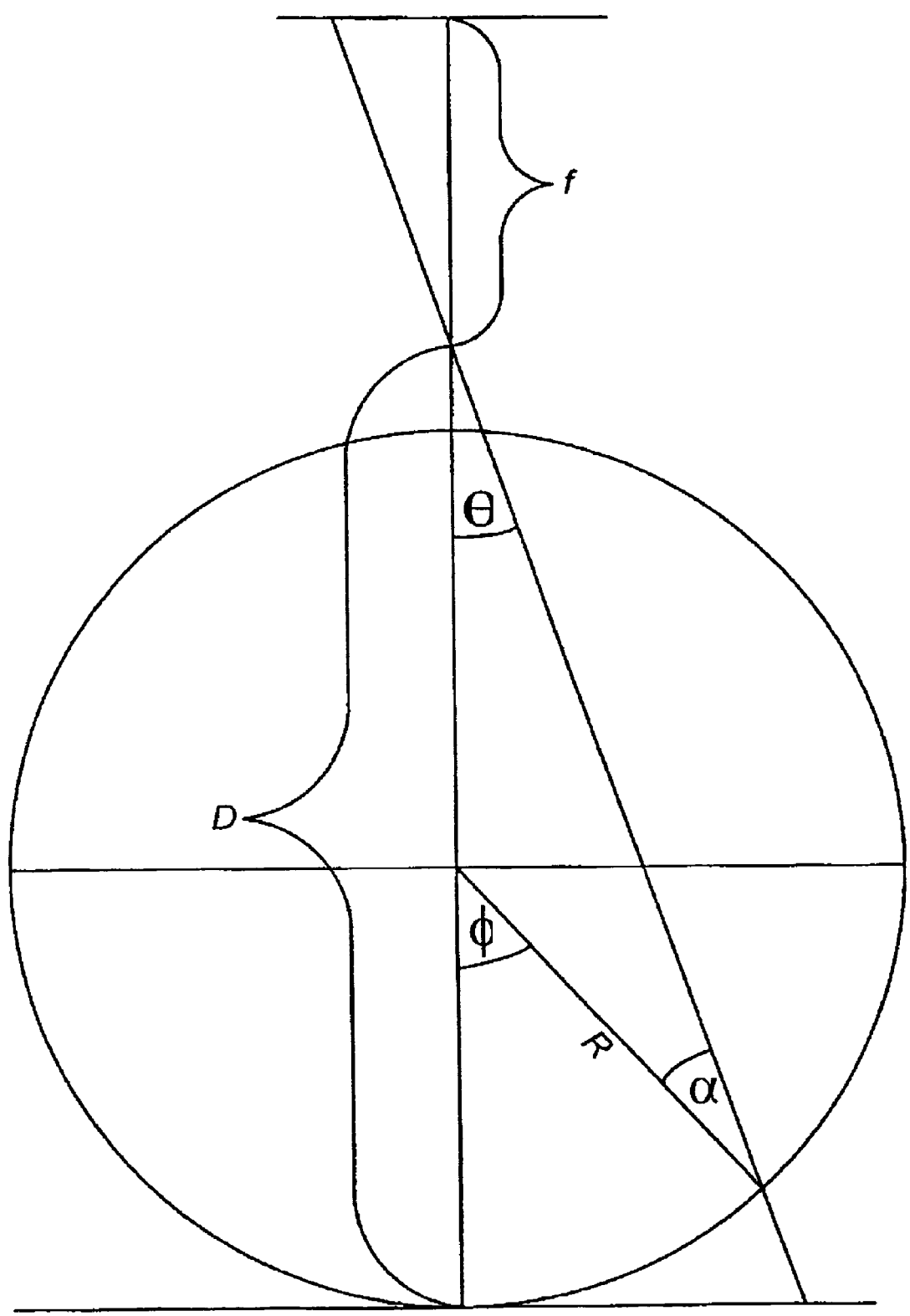
FIG. 11 is a graphical illustration of a predefined projection model, according to some embodiments of the present invention.

Reference is now made to FIG. 10, which is a flowchart illustration of a method of creating a consistent spherical montage substantially accurately representing a subject's fundus, according to further embodiments of the present invention. In accordance with some embodiments of the present invention, data corresponding to a consistent planar representation which is comprised of a plurality of images collectively corresponding to at least a portion of a fundus may be received at the device 800 (block 1002), and may be fed to the projection module 810. In accordance with some embodiments of the present invention, the projection module 810 may project the data corresponding to the planar representation onto a predefined projection model (block 1004). Reference is now additionally made to FIG. 11, which is a graphical illustration of a predefined projection model, according to some embodiments of the present invention. According to some embodiments of the invention, the projection module may be based upon one or more of the following: a predefined geometrical model of a fundus; initial optical characteristics of an imaging system used to generate the images; and initial relative position of the imaging system and the fundus. According to further embodiments of the invention, the projection module 810 may be adapted to adjust one or more of the plurality of images in accordance with a predefined spherical mapping policy and/or a predefined spherical projection model and/or may be adapted to adjust one or more of the plurality of images based upon the predefined spherical mapping policy and/or the predefined spherical projection model. The graphical illustration in FIG. 11, corresponds to one example of a predefined spherical projection model. As can be seen in FIG. 11, and according to some embodiments of the invention, the predefined projection model may correspond to the geometrical and optical (physical) characteristics of a human eye and a camera positioned relative to the eye.

In accordance with some embodiments of the present invention, as part of projecting the data corresponding to the planar representation onto the predefined projection model, the projection module 810 may be adapted to modify the relative position of one or more of the plurality of images comprising the planar representation of the fundus in accordance with a predefined spherical mapping policy (block 1010). In accordance with further embodiments of the present invention, the spherical projection module 110 may be adapted to calculate for each of the plurality of images specific spherical mapping values based upon the predefined mapping policy. The spherical mapping values calculated for each of the plurality of images may be used to modify the relative position of an image in respect of one or more of the images which correspond to the planar representation. According to further embodiments of the invention, the projection module 810 may be adapted to modify the relative positions of the images in accordance with at least a parameter corresponding to an (initial) optical perspective and a parameter corresponding to an (initial) optical media associated with an eye and an image rendering system used to photograph the fundus. According to further embodiments of the invention, the relative positions of the images may be modified in accordance with a predefined optical configuration corresponding to an eye and an image rendering system used to photograph the fundus, and the relationship therebetween.

According to further embodiments of the invention, the spherical mapping values may relate to a certain point of an image, for example, the center of the image, and may indicate where that point should be positioned relative to the other images. According to further embodiments of the invention, the spherical mapping values may be associated with a spherical model substantially corresponding to a fundus, and a certain spherical mapping value may relate to a specific location on the spherical model of the fundus. Thus, the plurality of images may be positioned on the spherical model in accordance with the spherical value associated with each image. In accordance with yet further embodiments of the invention, as part of calculating for each of the plurality of images the spherical mapping values, the projection module 810 may be adapted to calculate, for example, at least three Euler angles (one for each of: direction, elevation and rotation angle) in accordance with which, each of the plurality of images may be positioned on the spherical model. Alternatively, according to further embodiments of the present invention, an equivalent 3D position representation, for example a normalized 4 elements vector, known as Quaternion, may be used.

In accordance with some embodiments of the present invention, further as part of projecting the data corresponding to the planar representation of the fundus onto the predefined spherical model, the projection module 810 may be adapted to adjust one or more of the plurality of images comprising the planar representation (block 1020). According to further embodiments of the invention, the projection module 810 may be adapted to adjust the images in accordance with at least an optical perspective and optical media associated with an eye and an image rendering system used to photograph the fundus. According to further embodiments of the invention, the images may be adjusted in accordance with a predefined optical configuration corresponding to an eye and an image rendering system used to photograph the fundus, and the relationship therebetween. For example, in accordance with some embodiments of the present invention, the optical factor may be associated with an additional scalar parameter for each image of the plurality of images. The additional scalar parameter may be used to represent a first order cumulative distortion related to the eye and the fundus camera optics. According to yet further embodiments of the invention, adjusting an image may include adjusting at least a visual feature within the image. Once the positioning of the planar representation on the spherical model and the adjustments to the images constituting the planar representation are completed, an initial spherical representation of the fundus may be created.

The initial spherical representation may require, as mentioned above, some optimizing for it to substantially correctly represent the subject's fundus. Accordingly, the spherical optimization module 820 may be utilized to optimize the initial spherical representation in accordance with a predefined optimization strategy. In accordance with some embodiments of the present invention, the spherical optimization module 820 may be adapted to implement the optimization strategy in a manner to receive a substantially accurate and consistent spherical montage representing the subject's fundus (block 1006).

In accordance with some embodiments of the present invention, as part of optimizing the spherical representation of the fundus, the spherical optimization module 820 may be adapted to provide, in accordance with the predefined optimization strategy, a set of spherical mapping values and an optical factor to be used for optimizing the spherical montage (block 1030). In accordance with some embodiments of the present invention, the predefined optimization strategy may be generated, for example, based upon one or more of the following: a predefined geometrical model of the fundus; a predefined range of assumed optical characteristics of the imaging system; and a predefined range of assumed relative positions of the imaging system and the fundus. The spherical optimization strategy may include optimization rules and parameters and may be implemented electronically. The electronic data corresponding to the spherical optimization strategy may be stored on an electronic storage medium. Further details in respect of the optimizing strategy in accordance with some embodiments of the invention shall be provided hereinbelow.

As will be described below in further detail, in accordance with some embodiments of the present invention, before each optimization iteration the spherical optimization module 820 may be adapted to consult the optimization strategy to receive a new set of spherical mapping values and/or an optical factor to be used for (further) optimizing the spherical representation of the fundus. The new set of mapping values and/or the new optical factor may be selected in accordance with the old ones. According to some embodiments of the invention, whenever a new set of spherical mapping values and/or optical factor is issued, the spherical optimization may store data corresponding to the set which is issued and may use that data when requesting a new set, in case a new set needs to be provided (for further optimization). In accordance with further embodiments of the present invention, as part of each optimization iteration the predefined optimization strategy may be used to provide various combinations of possible geometrical models of the fundus, optical characteristics of the imaging system and/or of the eye, and/or relative positions of the imaging system and the fundus, based upon which the spherical optimization module 820 may provide at least a set of spherical mapping values and an optical factor.

In accordance with some embodiments of the invention, the optimization strategy may be based upon an optimization algorithm which is based upon a multi dimensional search for a feasible solution to a problem which minimizes a target function. In accordance with some embodiments of the present invention, the spherical optimization module 820 may be adapted to reposition one or more of the plurality of images which are part of the input spherical representation (which corresponds to the initial spherical optimization or to a previous version of the optimized spherical representation). For example, the images may be repositioned in accordance with new spherical mapping values provided in accordance with the spherical optimization strategy (block 1040). In addition or as an alternative, the spherical optimization module 820 may be adapted to transform or adjust features within one or more of the plurality of images which are part of the spherical representation, for example, in accordance with the optical factor provided by the optimization strategy (block 1050).

According to some embodiments of the invention, once the images are repositioned and/or are adjusted, the spherical representation may be evaluated in accordance with the changes made (block 1008). In accordance with some embodiments of the present invention, as part of evaluating the modified spherical representation, for each overlapping pair of images, corresponding features within the overlapping area of the images may be distinguished (block 1060). According to some embodiments of the present invention, a feature enhancement image-processing technique may be used for distinguishing features from each image within its overlapping portion with the matching image(s). The feature-enhancement image-processing technique based upon the gradient modulo of the images, which was described above with reference to local matching may be used. For example, the norm of a gradient of an image may denoted by:

$$|\nabla I| = \sqrt{(\partial_x I)^2 + (\partial_y I)^2} \quad \text{(Eq. 5)}$$

However, it should be noted that the present invention is not limited in this respect and other suitable techniques may be utilized.

In accordance with some embodiments of the present invention, once the features are identified, the spherical optimization module 820 may be adapted to calculate a distortion value for each pair of partially overlapping images. The optimization module 820 may then identify corresponding features within the overlapping portions of the images. According to some embodiments of the invention, once the corresponding features are identified, optimization module 820 may be adapted to calculate the distortion value based upon a divergence of corresponding features (block 1070). According to some embodiments of the invention, as part of determining the divergence of two features each from overlapping portions of two images, an image-processing cross-correlation technique may be used, for example, Eq. 2 described above may used. However, according to further embodiments of the invention, in case the feature points are known and their new location is determined, it may not be necessary to use Eq. 2 since the new location of each feature point is known.

In accordance with some embodiments of the present invention, once the distortion values are calculated for each of the corresponding features within the overlap area of each pair of overlapping images, the spherical optimization module 120 may be adapted to sum the distortion values calculated for each overlapping pair of images, and may record the sum (block 1080).

According to further embodiments of the invention, the optimization strategy may be configured to attempt to minimize a target function. The target function may correspond to a global distortion between the plurality of images which are part of the spherical representation. According to yet further embodiments of the invention, the global distortion is associated with the distortion between one or more (including each) partially overlapping images which are included in the spherical representation. According to still further embodiments of the invention, a distortion between two partially overlapping images, which are part of the spherical representation may be determined based upon a sum of the distances between matching features or matching feature points within overlapping portions of the two images. It would be appreciated that in accordance with some embodiments of the invention, the optimization strategy may be configured to provide different parameters for each iteration of the optimization strategy, and thus, each iteration may cause the relative positions of the images to be modified when compared with a their previous positions and/or may cause the images to be adjusted (for example, a feature may be adjusted and/or the relative position of a feature may be modified). Accordingly, it would be further appreciated that at each iteration of the optimization strategy the distortion between a pair of images may change with respect to the distortion between the same pair at a different iteration.

According to some embodiments of the invention, any of Equations 1-4 which have been described above in greater detail with reference to the method and device for enabling an automatic global matching of a plurality of images to provide a consistent planar representation of the fundus, may be used to distinguish features, to match features from overlapping portions of two images and/or to determine the distance between features (for example, to determine the distance between features which have been determined to be matching features). According to further embodiments of the invention, the process and/or the device for enabling an automatic global matching of a plurality of images to provide a consistent planar representation of the fundus substantially as described above in greater detail may be combined with a device and/or a method according to the present invention, and data with respect to identified features and/or matching between features may be provided based upon calculations performed during the process of providing a consistent planar representation of the fundus, substantially as described above.

According to some embodiments of the invention, the distortion between the overlapping images may be used to determine the global distortion associated with a certain set of optimization parameters provided by the optimization strategy. According to further embodiments of the invention, the target function may correspond to the sum of the distortions between each pair of partially overlapping images based upon the parameters provided by a certain iteration of the optimization strategy.

In accordance with some embodiments of the present invention, once the sum of the distortion values for a certain iteration of the spherical optimization is calculated, the spherical optimization module 820 may then check the sum to determine whether it satisfies a predefined optimization convergence criterion (block 1085). In accordance with some embodiments of the invention, an optimization method known as the "Nelder-Mead Simplex Method" may be used. It would be appreciated by those of ordinary skill in the art that the Nelder-Mead Simplex Method attempts to minimize a scalar-valued nonlinear function of 'n' real variables using only function values, without any derivative information (explicit or implicit). The Nelder-Mead method maintains at each step a non-degenerate simplex, a geometric figure in 'n' dimensions of nonzero volume that is the convex hull of 'n+1' vertices. Each iteration of a simplex-based direct search method begins with a simplex, specified by its 'n+1' vertices and the associated function values. One or more test points are computed, along with their function values, and the iteration terminates with bounded level.

In accordance with some embodiments of the present invention, in case it is determined at block 1085 that the distortion values sum indeed satisfies the predefined optimization convergence criterion, the spherical optimization module 820 may complete the optimization of the spherical representation and may forward the optimized spherical representation to an image rendering system or device (not shown) where the optimized spherical representation may be rendered to provide a consistent spherical montage substantially accurately representing the subject's fundus (block 1090).

However, in accordance with further embodiments of the present invention, if it is determined at block 1085 that the distortion values sum does not satisfy the predefined optimization convergence criterion, the spherical optimization module 820 may be adapted to consult the optimization strategy to receive a new set of spherical mapping values and/or an optical factor to be used for (further) optimizing the spherical montage (block 1095). In accordance with some embodiments of the present invention, as part of consulting the predefined optimization strategy, the spherical optimization module 820 may be adapted to obtain, for example, a specific combination of a geometrical model of the fundus, specific optical characteristics of the imaging system, and specific relative position of the imaging system and the fundus, and based upon which, the spherical optimization module 820 may derive the set of spherical mapping values and the optical factor. According to some embodiments of the invention, the optimization strategy may be based upon a set of parameters corresponding to the actual geometry of the human eye. According to further embodiments of the invention, if, for example after a certain period of time, or after a certain number of attempts, the results of the optimization do not converge, the spherical optimization module may terminate the optimization process and continue with the algorithm, and may, for example, render the best spherical representation thus far to provide an image corresponding to the best spherical representation.

Once the spherical optimization module 820 obtains the new set of spherical mapping values and/or an optical factor to be used for (further) optimizing the spherical montage, the spherical optimization module 820 may be configured to repeat blocks 1030-1085, until case it is determined at block 1085 that the distortion values sum indeed satisfies the predefined optimization convergence criterion, in which case, as mentioned above, the spherical optimization module 820 may complete the optimization of the spherical representation of the fundus and may forward the spherical representation to an image rendering system or device (not shown) where the spherical representation of the fundus may be rendered to provide a consistent spherical montage substantially accurately representing the subject's fundus (block 1090).

In accordance with further embodiments of the present invention, a series of retinal images is stabilized, following injection of fluorescein dye into the patient's blood vessels for the purpose of angiography. The stabilization is required to overcome relative camera-eye motion during the photographic session.

Figure 12A:
FIGS. 12A and 12B are retinal gradient images before and after removing an internal fixation device, respectively, according to some embodiments of the present invention.

In accordance with some embodiments of the present invention, an internal fixation device, possibly needle-shaped, is set in the patient's field of view, which serves as a fixation object for the patient during the photography session. The internal fixation device comprises a stable element in an otherwise unstable series of images, or it may move, but its movements are not linked to the relative eye-camera movements. It is therefore preferable to remove the internal fixation device from the images prior to the stabilization process. FIG. 12A shows a retinal gradient image including internal fixation device 1200.

In the example of a needle-shaped internal fixation device, it may be identified using two prominent features:
 The needle is a straight line, with typical dimensions.
 The needle tip is directed to the center of the fundus, where no blood vessels cross.

The first step is to use Hough transform on the image. The Hough transform computes how many image points are found on any possible line. Lines that contain a high number of pixels (appropriate to the needle length or more) are taken as candidate. The candidate lines are then separated to segments in which the line is continuous. Among segment of sufficient length, two measures are taken into consideration:
 The amount of pixels on the line but outside the segment.
 Distance of the tip from the image center.

Figure 12B:
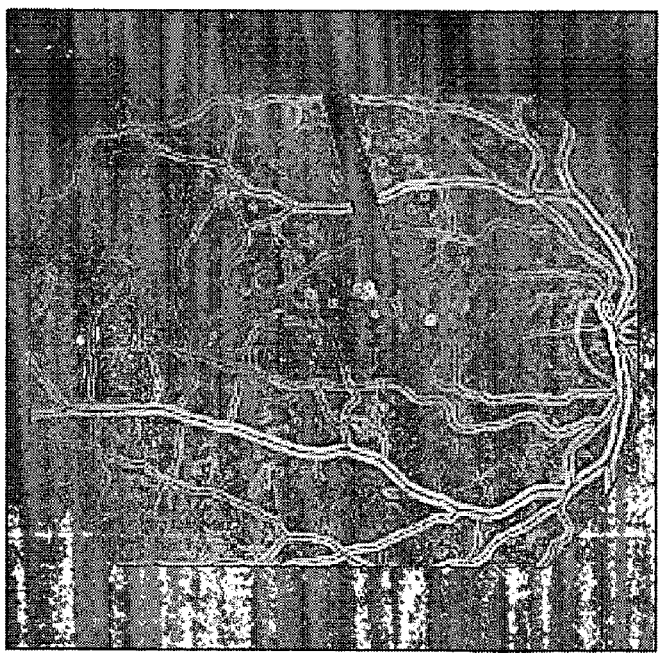

Those two measures may then be combined to form a score. If this score is lower than a predefined threshold value, the segment is declared as a needle and its surrounding is removed. FIG. 12B is the gradient retinal image of FIG. 12A after removal of the needle.

It will be appreciated that internal fixation devices having pre-defined shapes other than needle-shape may be detected using suitable image processing algorithms known in the art.

When the internal fixation device has been removed from all the images in the series to be stabilized, or alternatively, if no fixation device is used, or if it is desired not to remove the fixation device prior to stabilizing the image series, the stabilization process may be performed.

According to some embodiments of the present invention the removed internal fixation device and surroundings may be restored once the images have been aligned, so that the final product is a series of stabilized images including the internal fixation device.

The retinal image series stabilization process follows the same general steps as described above in conjunction with the montage process, using different optimization parameters, as will be explained in detail hereinbelow.

Figure 13:
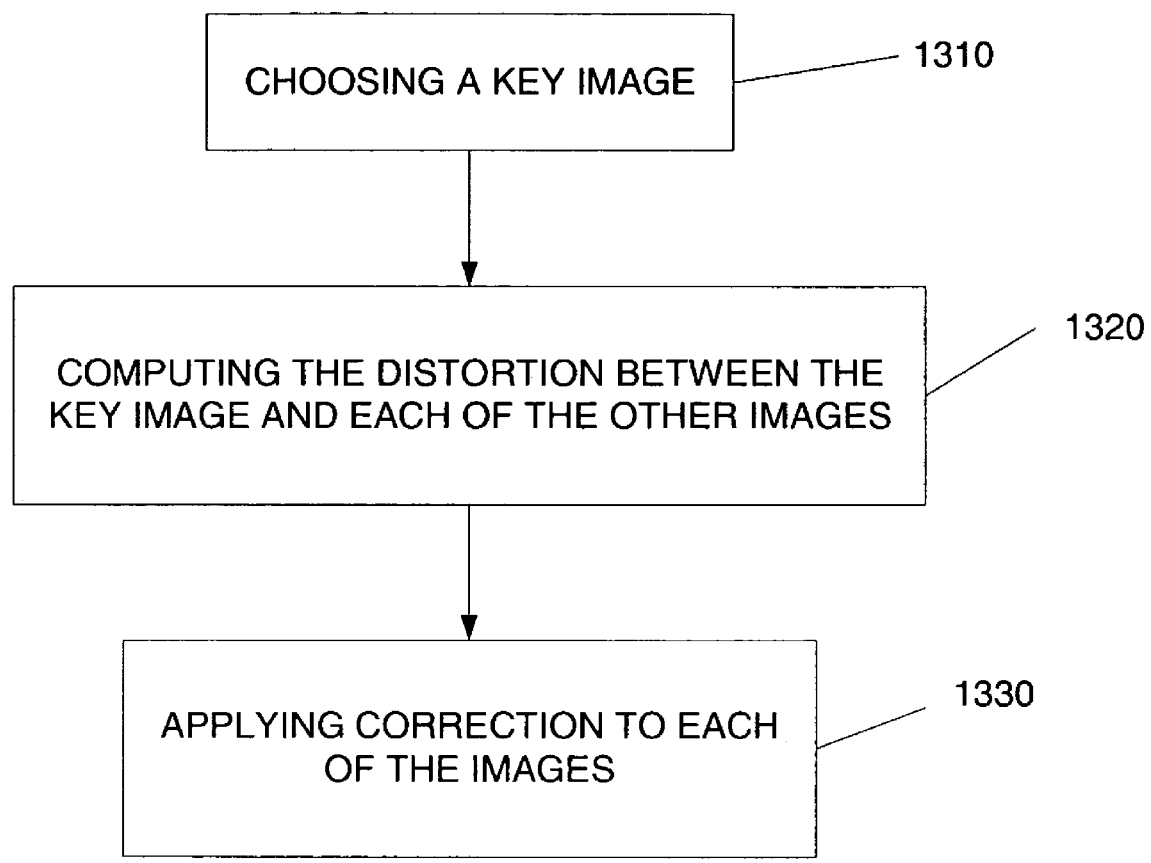
FIG. 13 is a flowchart describing the steps of the matching optimization process according to some embodiments of the present invention.

FIG. 13 is a flowchart describing the steps of the matching optimization process according to some embodiments of the present invention. The first step (1310) is to choose a 'key image', to which all the other images in the sequence will be aligned. In accordance with some embodiments of the present invention, the key image is chosen to be the image with the highest correlative information, as will be described in detail hereinbelow.

Figure 14A:
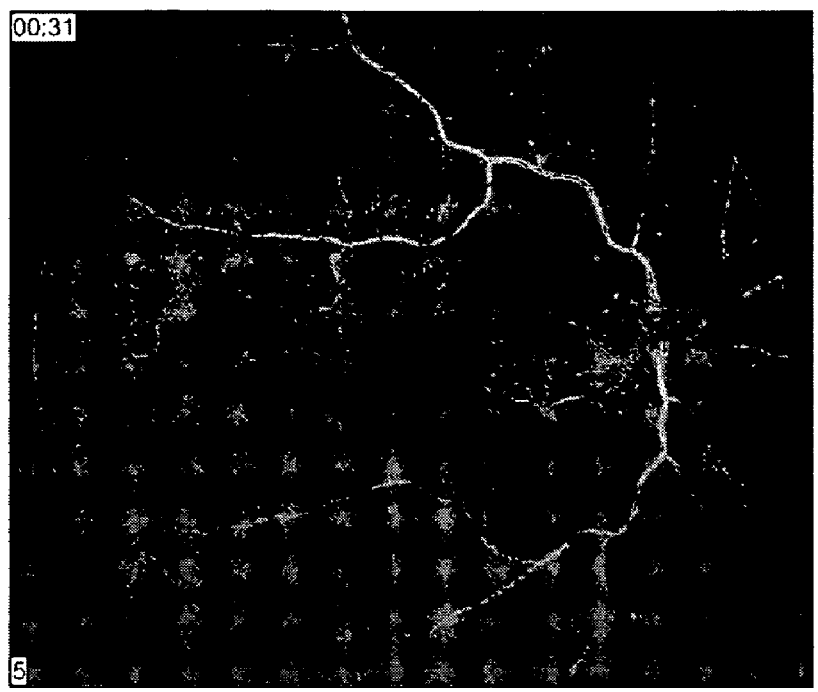
FIGS. 14A and 14B represent two angiography images taken at different times relative to the injection of the fluorescein dye, according to some embodiments of the present invention.
Figure 14B:
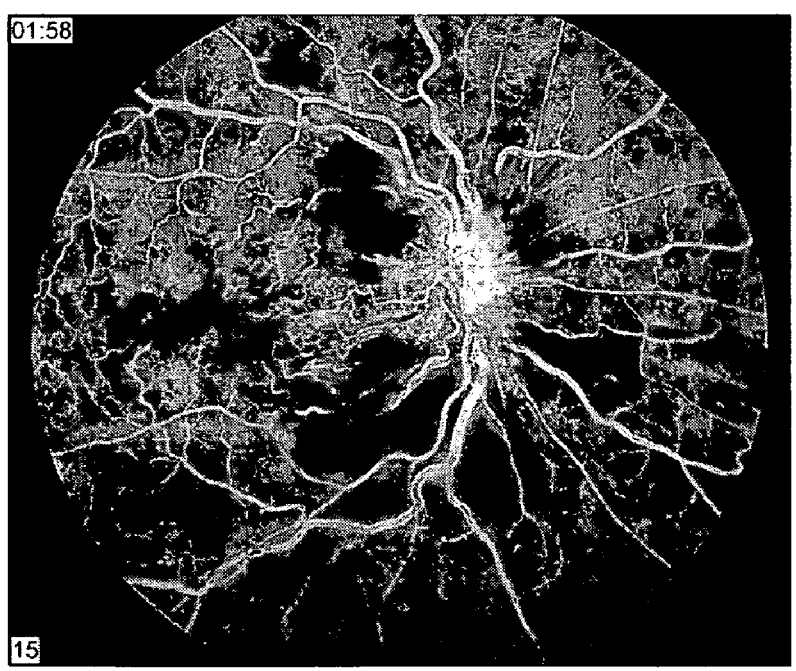

FIGS. 14A and 14B represent two angiography images taken at different times relative to the injection of the fluorescein dye. As can be seen, FIG. 14B, that was taken at a later time, shows many blood vessels that are not seen in FIG. 14A.

In accordance with some embodiments of the present invention, changes as described in conjunction with FIGS. 14A and 14B are taken into consideration when evaluating the match of a pair of images. For example, when calculating the correlation between two images, as described above in conjunction with FIGS. 2 and 3, features that give low normalized-correlation values may be ignored. The low normalized-correlation value may be computed from the statistics of the entire set of the normalized-correlation values.

In accordance with some embodiments of the present invention, the process of choosing a 'key image' (Step 1310) starts by matching each pair of images, as described hereinabove in conjunction with FIGS. 2 through 5. Next, a global matching process is performed, as described hereinabove in conjunction with FIGS. 6 and 7.

Following the local and global matching processes, a score is computed for each image. The image score is calculated by evaluating the match of:
 The given image;
 A copy of the same image with additive Gaussian noise; and
 The offset vector between the image and all other images.

The image with the highest score is taken to be the root or key image. This image and its features contain a high amount of correlative data. The other images will be registered to it.

Due to distortions of the optical systems and to the perspective of the retina surface, the images may be distorted. As a result, stabilizing the image by rigid motion may not give satisfactory results. To overcome this issue, a corrective transformation will be applied to each of the images.

The first step in the correction is to compute the distortion between the 'key image' and each of the other images (Step 1320). The distortion is computed by local matching of features using correlation.

According to some embodiments of the current invention, the corrective transformation model may be one of three models, and may be chosen by an external parameter.

1. Free quadratic:

$$x'=a_0+a_1x+a_2y+a_3x^2+a_4xy+a_5y^2$$

$$y'=b_0+b_1x+b_2y+b_3x^2+b_4xy+b_5y^2$$

2. Affine:

$$x'=a_0+a_1x+a_2y$$

$$y'=b_0+b_1x+b_2y$$

3. Translation:

$$x'=a_0+x$$

$$y'=b_0+x$$

where x, y are the coordinates, and the a's and the b's are the model parameters.

The feature's position is $$(x_1,y_1),(x_2,y_2),(x_3,y_3),\ldots,(x_n,y_n)$$

and the distortions from the key frame feature is $$(dx_1,dy_1),(dx_2,dy_2),(dx_3,dy_3),\ldots,(dx_n,dy_n)$$

We need to minimize the expressions below:

$$\sum_{i=1}^{n}[(a_0+a_1x_i+a_2y_i+a_3x_i^2+a_4x_iy_i+a_5y_i^2)-dx_i]^2$$

$$\sum_{i=1}^{n}[(b_0+b_1x_i+b_2y_i+b_3x_i^2+b_4x_iy_i+b_5y_i^2)-dy_i]^2$$

This is a linear least-square problem, which can be solved using, for example QR decomposition. In order to improve robustness, the result of the least square is examined; the values of the error are evaluated for each of the feature points $$[(a_0+a_1x_i+a_2y_i+a_3x_i^2+a_4x_iy_i+a_5y_i^2)-dx_i]^2$$

$$[(b_0+b_1x_i+b_2y_i+b_3x_i^2+b_4x_iy_i+b_5y_i^2)-dy_i]^2$$

the extremely large values (the tail of the distribution) are thrown, and the model is resolved.

The next step is to render the stabilized images (Step 1330), according to the coordinate transformations calculated in the model, as described hereinabove in conjunction with the three transformation models.

The corrected images may now be displayed in sequence, in the order they were taken, providing a stable continuity.

Figure 15A:
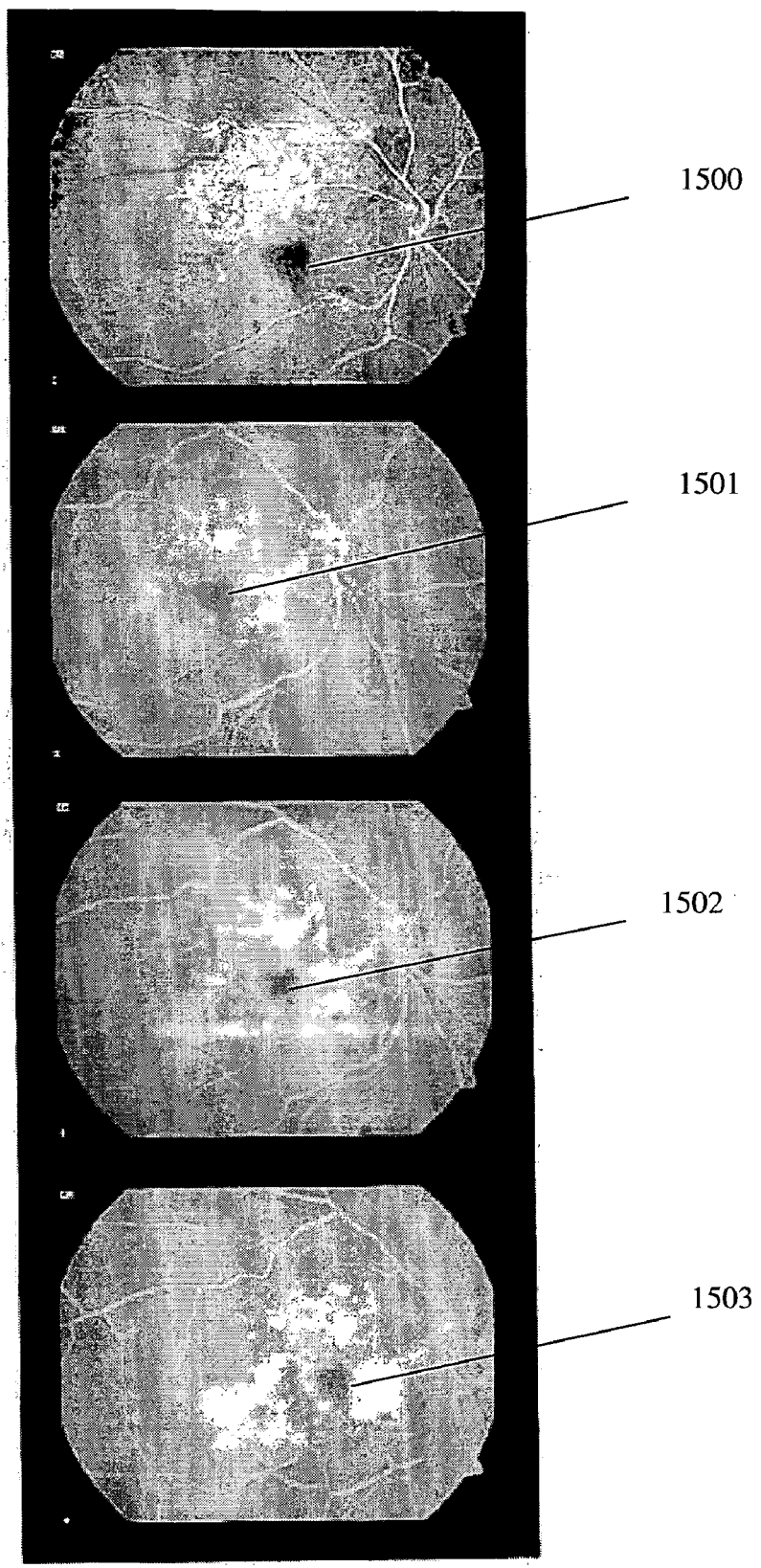
FIG. 15A shows an example of an original series of retinal images according to the present invention.

FIG. 15A shows a series of angiography retina images, taken at time intervals. The need to stabilize the given series of images becomes evident by looking at points 1500 through 1503, representing the same feature and positioned at different coordinates in each of the images.

Figure 15B:
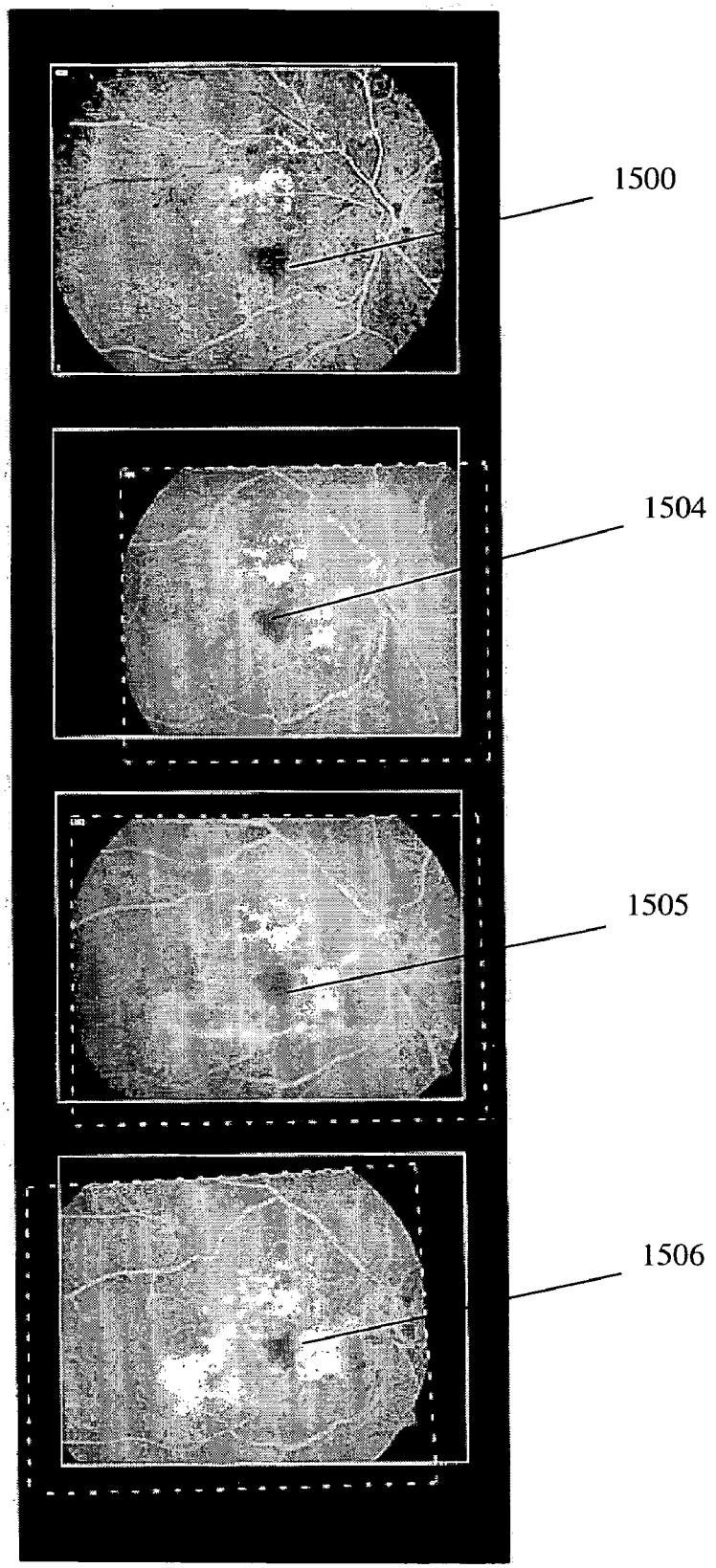
FIG. 15B shows the corrected images of FIG. 15A.

FIG. 15B shows the same series of images, after having undergone the corrective transformation as described above. The uppermost image has been selected in this case as the key image. Points 1504 through 1506 are the transformed points 1501 through 1503, respectively. The dotted lines represent the borders of the original images as shown in FIG. 15A. As can clearly be seen, points 1504 through 1506 are now aligned with point 1500 of the key image.

Figure 15C:
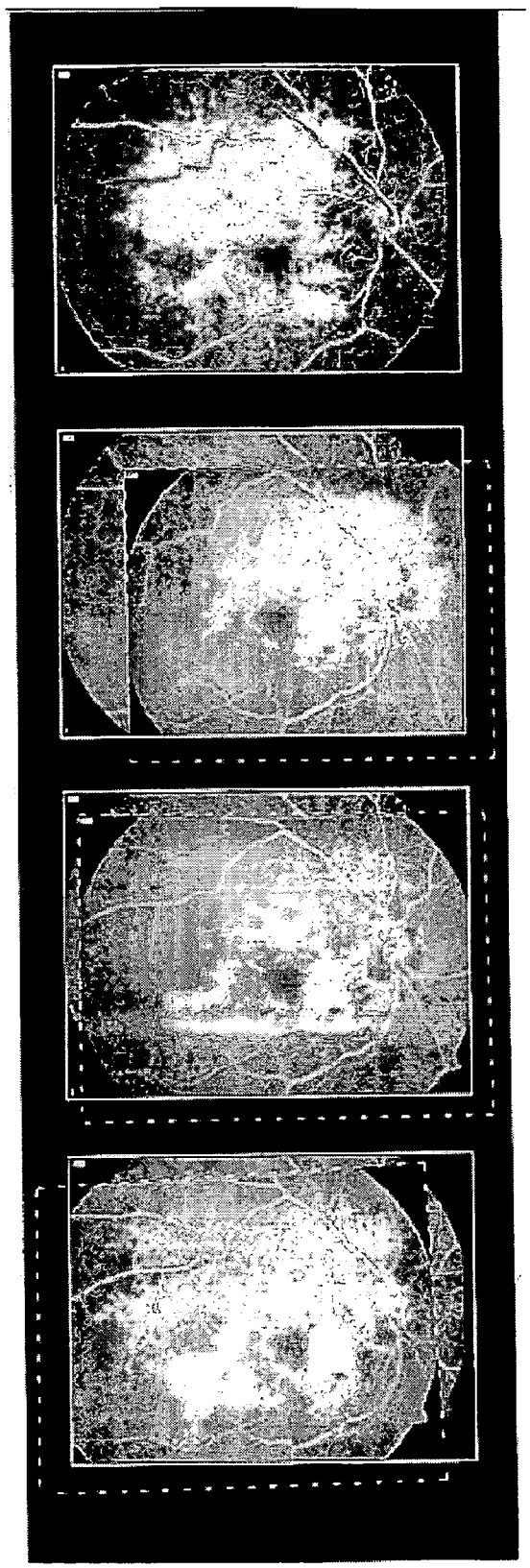
FIG. 15C shows the stabilized series of images of FIG. 15A.

FIG. 15C shows the corrected images of FIG. 15B, superimposed on the key image.

It will be understood that a system according to some embodiments of the invention the invention may be a suitably programmed computer. Likewise, some embodiments of the invention contemplate a computer program being readable by a computer for executing a method in accordance with some embodiments of the invention. Further embodiments of the invention contemplate a machine-readable memory tangibly embodying a program of instructions executable by the machine for executing a method in accordance with some embodiments of the invention.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A method of stabilizing a series of retinal angiography images to provide a coherent serial display, said method comprising:
    locally matching each pair of overlapping images, said locally matching includes at least providing a best offset vector for the images, wherein the best offset vector is provided based upon a matching of features from overlapping portions of the images;
    globally matching at least a triplet of matching pairs of images, wherein pairs of globally matching images include locally matching pairs whose best offset vector sum is substantially zero;
    choosing a key image;
    aligning remaining images from the series of images to the key image, wherein said aligning comprises computing distortions between the key image and each of the other images; and
    computing corrective transformations to compensate for the distortions using one of: a free quadratic model, an affine model and a translation model, and rendering the other images according to the computed corrective transformations.

2. The method according to claim 1, wherein said images comprise an internal fixation device and further comprising removing said internal fixation device from the series of images prior to said step of locally matching.

3. The method according to claim 2, further comprising restoring the internal fixation device to said series of images following said step of aligning.

4. The method according to claim 1, wherein said choosing a key image comprises choosing the image having a highest amount of correlative data with the other images.

5. The method according to claim 1, wherein said computing comprises matching features in said key image and in the other images using correlation.

6. An apparatus for stabilizing a series of retinal angiography images to provide a coherent serial display, comprising:
    means for locally matching each pair of overlapping images, said means for locally matching including at least means for providing a best offset vector for the images, wherein the best offset vector is provided based upon a matching of features from overlapping portions of the images;
    means for globally matching at least a triplet of matching pairs of images, wherein pairs of globally matching images include locally matching pairs whose best offset vector sum is substantially zero;
    means for choosing a key image; and
    means for aligning remaining images from the series of images to the key image, wherein the means for aligning comprises means for computing distortions between the key image and each of the other images;
    means for computing corrective transformations to compensate for the distortions using one of: a free quadratic model, an affine model and a translation model;
    means for rendering the other images according to the computed corrective transformations.

7. The apparatus according to claim 6, wherein said images comprise an internal fixation device and further comprising means for removing said internal fixation device from the series of images.

8. The apparatus according to claim 7, further comprising means for restoring the internal fixation device to said series of images.

9. The apparatus according to claim 6, wherein said means for choosing a key image comprise means for choosing the image having a highest amount of correlative data with the other images.

10. The apparatus according to claim 6, wherein said means for computing comprise means for matching features in said key image and in the other images using correlation.

11. A non-transitory program storage device readable by machine, tangibly embodying a program of instructions executable by the machine to perform method steps of enabling a stabilization of a series of retinal angiography images to provide a coherent serial display, said method comprising:
    locally matching a pair of overlapping images, said locally matching includes at least providing a best offset vector for the images, wherein the best offset vector is provided based upon a matching of features from overlapping portions of the images;
    globally matching at least a triplet of matching pairs of images, wherein pairs of globally matching images include locally matching pairs whose best offset vector sum is substantially zero;

choosing a key image;

aligning remaining images from the series of images to the key image, wherein said aligning comprises computing distortions between the key image and each of the other images; and computing corrective transformations to compensate for the distortions using one of: a free quadratic model, an affine model and a translation model, and rendering the other images according to the computed corrective transformations.

12. The program storage device according to claim 11, wherein said images comprise an internal fixation device and further comprising removing said internal fixation device from the series of images prior to said locally matching.

13. The program storage device according to claim 12, further comprising restoring the internal fixation device to said series of images following said aligning.

14. The program storage device according to claim 11, wherein said choosing a key image comprises choosing the image having a highest amount of correlative data with the other images.

15. The program storage device according to claim 11, wherein said computing comprises matching features in said key image and in the other images using correlation.

* * * * *